United States Patent
Eguchi et al.

(10) Patent No.: US 9,531,937 B2
(45) Date of Patent: Dec. 27, 2016

(54) IMAGE PICKUP APPARATUS FOR ACQUIRING A REFOCUS IMAGE, METHOD OF CONTROLLING IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventors: Kaoru Eguchi, Utsunomiya (JP); Koshi Hatakeyama, Tokyo (JP); Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 14/460,902

(22) Filed: Aug. 15, 2014

(65) Prior Publication Data
US 2015/0055010 A1   Feb. 26, 2015

(30) Foreign Application Priority Data

Aug. 22, 2013 (JP) ................ 2013-171816

(51) Int. Cl.
*H04N 5/225* (2006.01)
*G03B 13/36* (2006.01)
*H04N 5/232* (2006.01)

(52) U.S. Cl.
CPC ......... *H04N 5/23212* (2013.01); *G03B 13/36* (2013.01); *H04N 5/225* (2013.01)

(58) Field of Classification Search
None
See application file for complete search history.

(56) References Cited

U.S. PATENT DOCUMENTS

| | | | |
|---|---|---|---|
| 2003/0156216 A1* | 8/2003 | Nonaka | H04N 5/23212 348/345 |
| 2010/0141802 A1 | 6/2010 | Knight et al. | |

(Continued)

FOREIGN PATENT DOCUMENTS

| | | |
|---|---|---|
| JP | 59-146029 A | 8/1984 |
| JP | 2011-109310 A | 6/2011 |

OTHER PUBLICATIONS

European Search Report issued in Appl No. 14180940.0 dated Jan. 8, 2015.

(Continued)

*Primary Examiner* — Albert Cutler
(74) *Attorney, Agent, or Firm* — Rossi, Kimms & McDowell LLP

(57) ABSTRACT

An image pickup apparatus includes an imaging optical system, an image pickup element including a plurality of pixels, a lens array configured such that rays from the same position on an object plane are incident on pixels of the image pickup element different from each other depending on a pupil region of the imaging optical system through which the ray passes, an image processing unit configured to perform image processing for the input image acquired by the image pickup element to generate the output images, and a control unit configured to drive the imaging optical system to perform focus control, the image processing unit is configured to acquire information on a refocus control range, and the control unit is configured to perform the focus control based on the information on the refocus control range.

15 Claims, 20 Drawing Sheets

(56) References Cited

U.S. PATENT DOCUMENTS

| | | | |
|---|---|---|---|
| 2010/0283884 A1* | 11/2010 | Hayasaka | G02B 3/0056 |
| | | | 348/340 |
| 2011/0129165 A1* | 6/2011 | Lim | H04N 5/23212 |
| | | | 382/255 |
| 2013/0044256 A1 | 2/2013 | Hiasa et al. | |
| 2013/0057749 A1 | 3/2013 | Hiasa et al. | |
| 2013/0113981 A1 | 5/2013 | Knight et al. | |
| 2013/0222633 A1* | 8/2013 | Knight | H04N 5/23293 |
| | | | 348/222.1 |
| 2014/0240578 A1* | 8/2014 | Fishman | H04N 5/23293 |
| | | | 348/333.08 |

OTHER PUBLICATIONS

Ng et al., "Light Field Photography with a Hand-held Plenoptic Camera", 2005, Computer Science Technical Report CTSR Feb. 2005, pp. 1-11.

Georgiev et al.,"Superresolution with Plenoptic 2.0 Camera", 2009, Optical Society of America, pp. 1-3.

Isaksen et al., "Dynamically Reparameterized Light Fields", 2000, ACM, SIGGRAPH, pp. 297-306.

NG. "Fourier Slice Photography." Journal ACM Transactions on Graphics (TOG)—Proceedings of ACM SIGGRAPH. Jul. 2005: 735-744. vol. 24, Issue 3.

* cited by examiner

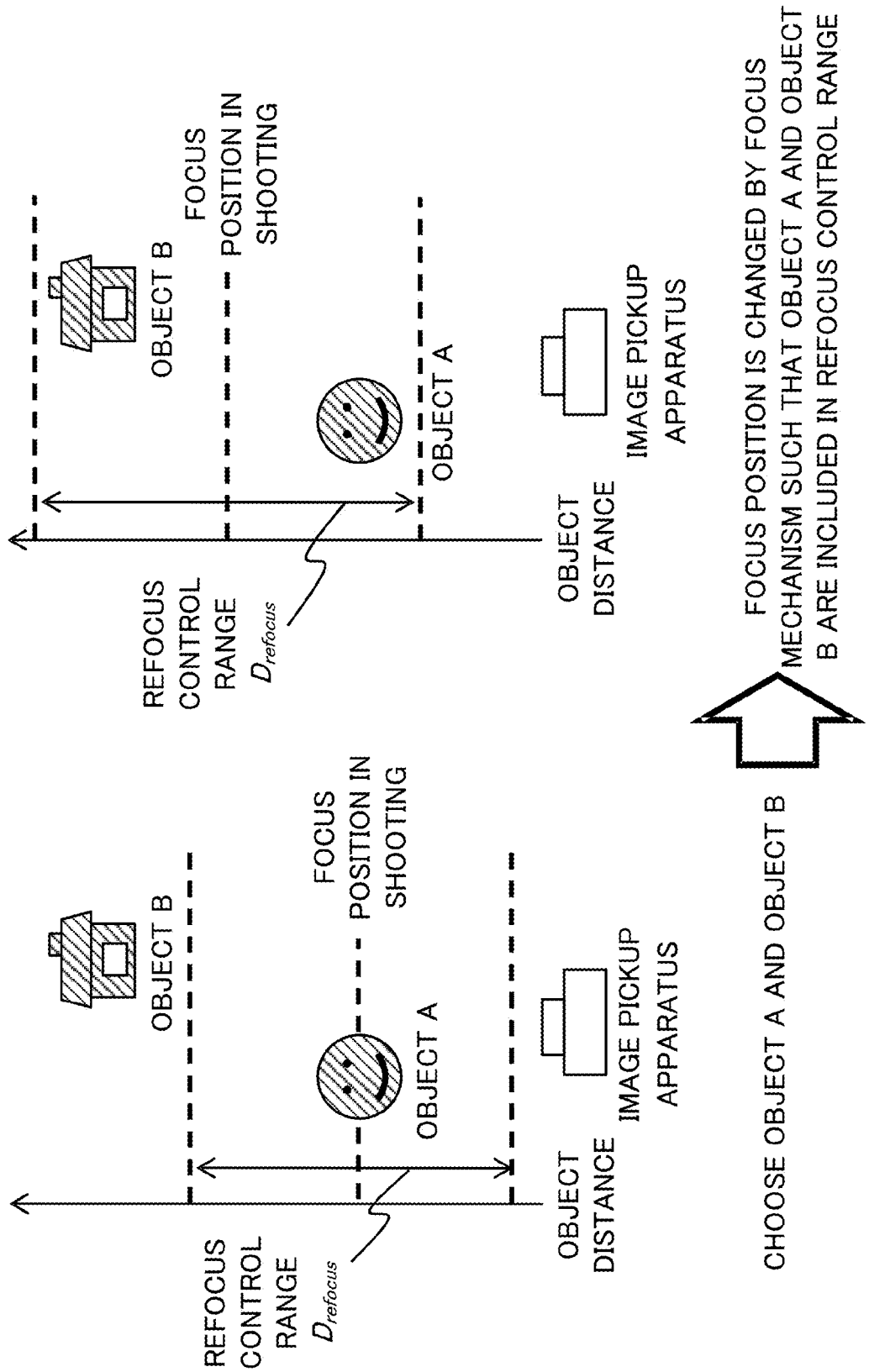

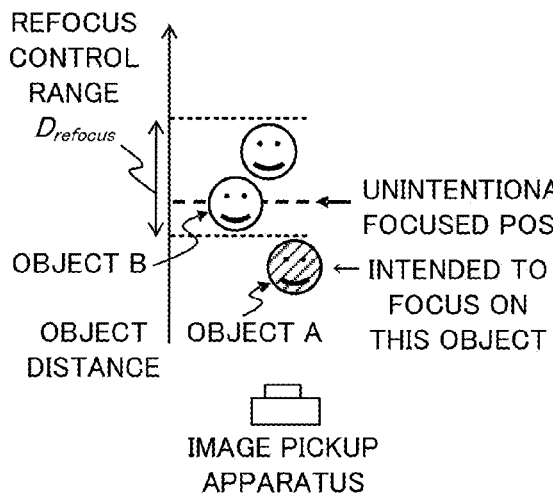
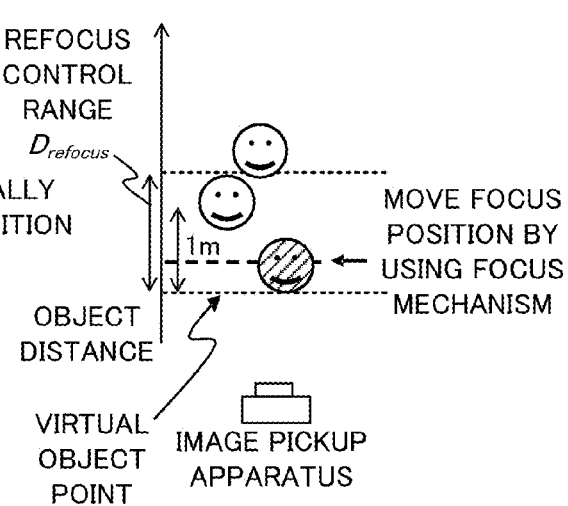
FIG. 20A
FIG. 20B
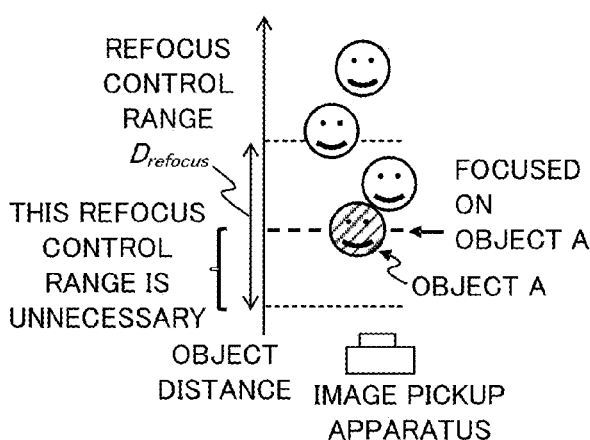
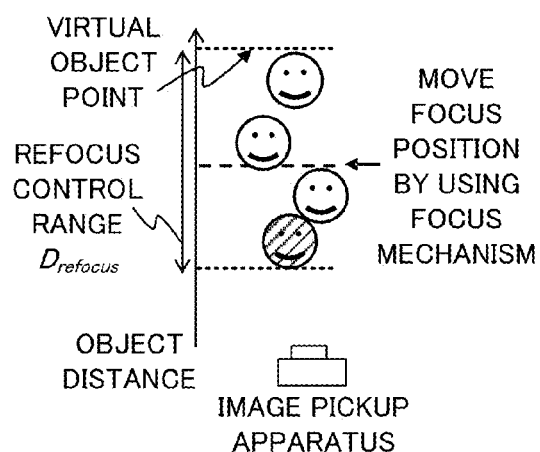
FIG. 21A
FIG. 21B

IN THE CASE OF FIRST EMBODIMENT
WHERE $R_{synth}$ IS EQUAL TO $5.2 \times 10^6$ AND $d_r$ IS EQUAL TO 0.61644

| THIRD FOCUS POSITION (IN-FOCUS POSITION) | OBJECT-SIDE REFOCUS CONTROL RANGE $D_{far}$ (IN-FOCUS POSITION REFERENCE) | OBJECT-SIDE REFOCUS CONTROL RANGE $D_{near}$ (IN-FOCUS POSITION REFERENCE) |
|---|---|---|
| 1m | INFINITY | 0.75m |
| 2m | INFINITY | 1.71m |
| 5m | INFINITY | 4.69m |
| 10m | INFINITY | 9.68m |
| 50m | INFINITY | 49.67m |

FIG. 22A

IN THE CASE OF SECOND EMBODIMENT
WHERE $R_{synth}$ IS EQUAL TO $6.0 \times 10^6$ AND $d_r$ IS EQUAL TO 0.99180

| THIRD FOCUS POSITION (IN-FOCUS POSITION) | OBJECT-SIDE REFOCUS CONTROL RANGE $D_{far}$ (IN-FOCUS POSITION REFERENCE) | OBJECT-SIDE REFOCUS CONTROL RANGE $D_{near}$ (IN-FOCUS POSITION REFERENCE) |
|---|---|---|
| 1m | 0.20m | 0.14m |
| 2m | 1.12m | 0.52m |
| 5m | 74.0m | 2.38m |
| 10m | INFINITY | 6.49m |
| 50m | INFINITY | 45.17m |

FIG. 22B

IMAGE PICKUP APPARATUS FOR ACQUIRING A REFOCUS IMAGE, METHOD OF CONTROLLING IMAGE PICKUP APPARATUS, AND NON-TRANSITORY COMPUTER-READABLE STORAGE MEDIUM

BACKGROUND OF THE INVENTION

1. Field of the Invention

The present invention relates to an image pickup apparatus capable of acquiring a refocus image.

2. Description of the Related Art

In recent years, image pickup apparatuses have been proposed which perform a calculation for data acquired by an image pickup element and digital image processing according to the calculation to output a variety of images. The literatures Ren Ng, et al., "Light Field Photography with a Hand-held Plenoptic Camera", 2005 Computer Science Technical Report CTSR, Todor Georgiev, et al., "Superresolution with Plenoptic 2.0 Camera", 2009 Optical Society of America, and Aaron Isaksen, et al., "Dynamically Reparameterized Light Fields", ACM SIGGRAPH, pp. 297-306 (2000) disclose image pickup apparatuses that simultaneously acquire a two-dimensional intensity distribution of light and angle information of a ray in an object space. The two-dimensional intensity distribution of light and the angle information of the ray are hereinafter collectively referred to as a "light field", and acquiring the light field enables the acquisition of three-dimensional information on an object space. The image pickup apparatuses described above can change a focus position of an image, which is referred to as "refocusing", change a shooting viewpoint, adjust a depth of field, and perform like operations, by acquiring the light field and performing the image processing after shooting the image.

Japanese Patent Laid-Open No. ("JP") 2011-109310 discloses a configuration which utilizes a refocus function as an auxiliary function for autofocusing. JP S59-146029 discloses a configuration which shoots an image with a focus position being displaced depending on a depth of field determined by an aperture stop such that a plurality of objects are included within the depth of field.

While it is possible to change a focus position by the refocus function after a shooting, the focus position cannot be necessarily set to an arbitrary position because a range within which the focus position can be changed is limited. This may prevent a user, after the shooting, from changing a focus position to another point intended by the user. This means that a plurality of arbitrary objects cannot be included together in a refocus range with the configuration disclosed in JP 2011-109310. Similarly, it is impossible to generate a refocus image with the configuration disclosed in JP S59-146029.

SUMMARY OF THE INVENTION

The present invention provides an image pickup apparatus capable of, after a shooting, acquiring a refocus image with a focus position intended by a user, a method of controlling the image pickup apparatus, and a non-transitory computer-readable storage medium.

An image pickup apparatus as one aspect of the present invention is an image pickup apparatus capable of reconstructing an input image to generate a plurality of output images with focus positions different from each other and includes an imaging optical system, an image pickup element including a plurality of pixels, a lens array configured such that rays from the same position on an object plane are incident on pixels of the image pickup element different from each other depending on a pupil region of the imaging optical system through which the ray passes, an image processing unit configured to perform image processing for the input image acquired by the image pickup element to generate the output images, and a control unit configured to drive the imaging optical system to perform focus control. The image processing unit is configured to acquire information on a refocus control range. The control unit is configured to perform the focus control based on the information on the refocus control range.

An image pickup apparatus as another aspect of the present invention is an image pickup apparatus capable of reconstructing an input image to generate a plurality of output images with focus positions different from each other and includes an imaging optical system, at least one image pickup element including a plurality of pixels, an image processing unit configured to generate the output images from the input image acquired by the image pickup element, and a control unit configured to drive the imaging optical system to perform focus control. When a pupil of the imaging optical system is a pupil formed by combining pupils of the plurality of optical systems, the plurality of optical systems are arranged such that rays from the same position on an object plane are incident on pixels of the image pickup element different from each other depending on a pupil region of the imaging optical system through which the ray passes. The image processing unit is configured to acquire information on a refocus control range. The control unit is configured to perform the focus control based on the information on the refocus control range.

A method of controlling an image pickup apparatus as another aspect of the present invention is a method of controlling an image pickup apparatus capable of reconstructing an input image to generate a plurality of output images with focus positions different from each other and includes the steps of acquiring the input image that is an image formed by acquiring information on an object space from a plurality of viewpoints, by using an image pickup apparatus which includes an imaging optical system and an image pickup element including a plurality of pixels, acquiring information on a refocus control range, and performing focus control based on the information on the refocus control range.

A non-transitory computer-readable storage medium as another aspect of the present invention is a storage medium storing a program configured to cause a computer to execute a method of controlling an image pickup apparatus capable of reconstructing an input image to generate a plurality of output images with focus positions different from each other, and the method includes the steps of acquiring the input image that is an image formed by acquiring information on an object space from a plurality of viewpoints, by using an image pickup apparatus which includes an imaging optical system and an image pickup element including a plurality of pixels, acquiring information on a refocus control range, and performing focus control based on the information on the refocus control range.

Further features and aspects of the present invention will become apparent from the following description of exemplary embodiments with reference to the attached drawings.

BRIEF DESCRIPTION OF THE DRAWINGS

FIGS. 19A and 19B are diagrams illustrating an example of a shooting scene in the first, second, third, and fourth embodiments.

FIGS. 20A and 20B are diagrams illustrating an example of a shooting scene in the first, second, third, and fourth embodiments.

FIGS. 21A and 21B are diagrams illustrating an example of a shooting scene in the first, second, third, and fourth embodiments.

FIGS. 22A and 22B are explanatory diagrams of the refocus control range in the first embodiment.

DESCRIPTION OF THE EMBODIMENTS

Figure 1:
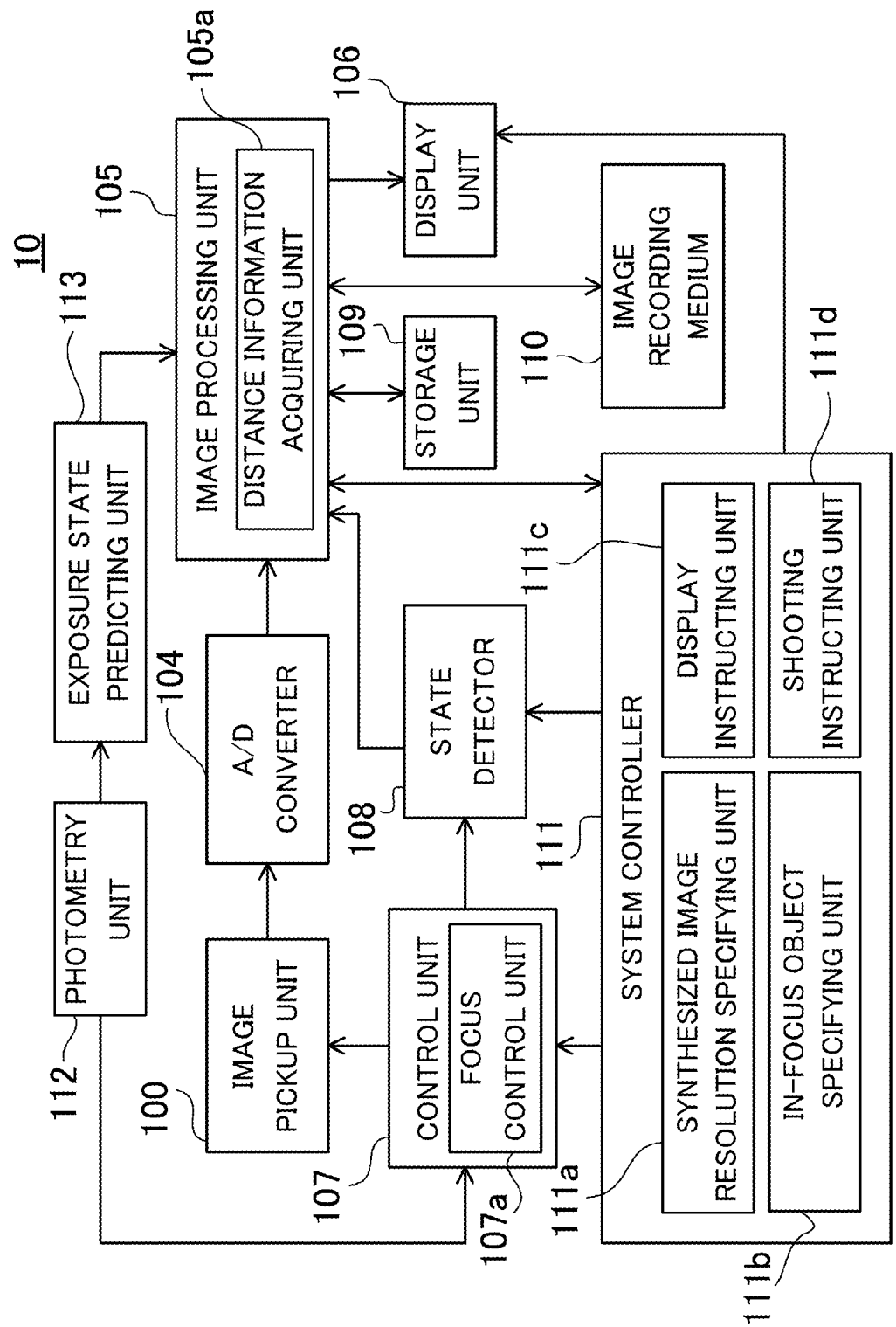
FIG. 1 is a block diagram of an image pickup apparatus in first, second, and third embodiments.

Exemplary embodiments of the present invention will be described below with reference to the accompanied drawings. In each of the drawings, the same elements will be denoted by the same reference numerals and the duplicate description thereof will be omitted.

An image pickup unit of this embodiment acquires a plurality of parallax images, which are images of an object space shot from a plurality of viewpoints, namely, a light field. The "object space" as used herein means a real space in an angle of view that can be acquired by the image pickup apparatus of this embodiment. Examples of the configuration of the image pickup unit include configurations illustrated in FIGS. 2 to 4 in which a lens array is arranged at an image side of an imaging optical system and a configuration illustrated in FIG. 5 in which a plurality of imaging optical systems are arrayed. In addition, as an example of a method of acquiring the light field, a method can be adopted which performs a shooting multiple times using an image pickup apparatus that includes the imaging optical system and an image pickup element while changing a position of the image pickup apparatus. In this method, the image pickup apparatus captures parallax images in an object space at time points different from each other. For this reason, it is impossible to acquire correct parallax information when a moving object is present in the object space. It is thus desirable that the image pickup unit has a configuration capable of simultaneously acquiring a plurality of parallax images as illustrated in FIGS. 2 to 5.

Performing various processing such as extraction, change of order, and synthesis of pixels, for the parallax images acquired with the configurations illustrated in FIGS. 2 to 5 enables refocusing, control of a depth of field, change of a viewpoint, and the like. In this embodiment, the processing is referred to as "reconstruction" and an image generated by the reconstruction as a "reconstructed image". In particular, an image which has been subjected to refocus processing is referred to as a "refocus image". The refocus image may be an image which has been subjected to processing such as noise reduction and reconstruction processing such as control of a depth of field. In addition, a range in an object space within which the refocusing can be performed is referred to as a "refocus control range".

A person or an object is not necessarily required to be present on an object plane 201 illustrated in FIGS. 2 to 5. This is because a focus position of the person or the object that is present at a far side or a near side of the object plane 201 can be controlled after a shooting by the refocus processing. While each of the following embodiments may be described using a one-dimensional system for ease of reference, a similar description holds when a two-dimensional system is used.

First Embodiment

Figure 2:
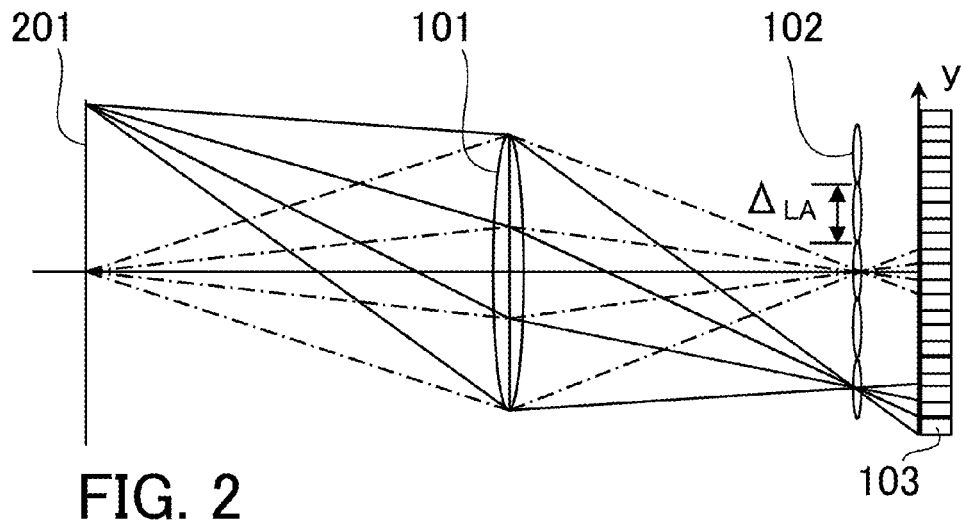
FIG. 2 is a schematic configuration diagram of an image pickup unit in the first embodiment.

First of all, referring to FIGS. 1 and 2, a basic configuration of the image pickup apparatus in the first embodiment of the present invention will be described. FIG. 1 is a block diagram of an image pickup apparatus 10 in this embodiment. FIG. 2 is a schematic configuration diagram of an image pickup unit 100 in this embodiment.

The image pickup apparatus 10 of this embodiment is capable of generating a plurality of output images with focus positions different from each other by reconstructing an input image. As illustrated in FIG. 2, the image pickup unit 100 includes an imaging optical system 101, a lens array 102, and an image pickup element 103 which are arranged in this order from the object plane 201. The details of the image pickup unit 100 will be described later.

The image pickup element 103 is a two-dimensional image pickup element such as a CCD (Charge Coupled Device) or a CMOS (Complementary Metal-Oxide Semiconductor) sensor. The image pickup element 103 includes a plurality of pixels and photoelectrically converts an object image (an optical image). In other words, energy of rays that have passed through the imaging optical system 101 and the lens array 102 and are then incident on the image pickup element 103 is converted into an electric signal (an analog signal). An A/D convertor 104 converts the analog signal sent from the image pickup unit 100 (the image pickup element 103) into a digital signal. An image processing unit 105 performs predetermined processing for the digital signal to generate a display image. In addition, the image processing unit 105 performs image generation processing such as refocus processing, which will be described later, based on image pickup data acquired by the image pickup unit 100 or on that acquired by a storage unit 109. As described above, the image processing unit 105 performs image processing for the image pickup data, such as an input image, acquired by the image pickup element 103 to generate the output images. The details of the image processing unit 105 will be described later.

The display image generated by the image processing unit 105 is output and displayed on a display unit 106 such as a liquid crystal display. A user can perform the shooting while viewing the image being displayed on the display unit 106 to check the image to be shot. In addition, the display unit 106 may have a touch screen function. In this case, it is also possible to treat a user's instruction given by using a touch screen as an input. The display image is generated by using an image acquisition condition (shooting condition information), information from an exposure state predicting unit 113 or an image recording medium 110, distance information acquired by a distance information acquiring unit 105a, or the like. The "image acquisition condition (shooting condition information)" as used herein means a configuration of the image pickup unit 100, an exposure state determined by the aperture stop or the like, a focus position, a focal length of a zoom lens, or the like at the time when the analog signal is acquired. The image acquisition condition may be acquired by a state detector 108 directly from a system controller 111, and information on the image pickup unit 100 may be acquired from a control unit 107. In this embodiment, information on the configuration of the image pickup unit 100 is stored in the storage unit 109. The exposure state predicting unit 113 predicts an exposure state observed in the shooting based on information from a photometry unit 112. The distance information acquiring unit 105a acquires distance information of an object space (an object) by using input parallax information (parallax information on the input image). The distance information is used to calculate a refocus control range.

The system controller 111 includes a display instructing unit 111c. The display unit 106 switches "ON" and "OFF" of display and the display image based on a signal from the display instructing unit 111c. For instance, when the image pickup apparatus 10 includes a release button, the display instructing unit 111c displays a display signal of the display image while the user pushes the release button down to a first position. In this situation, pushing the release button down to a second position deeper than the first position causes the image pickup apparatus to perform the shooting. This embodiment, however, is not limited to this and the display instructing unit 111c may be alternatively configured to send the signal by other means.

The system controller 111 further includes an in-focus object specifying unit 111b which specifies an object to be focused by the image pickup unit 100. A focus control unit 107a provided in the control unit 107 drives a focus mechanism of the image pickup unit 100 based on a signal from the in-focus object specifying unit 111b to focus a specified object. That is, the control unit 107 (the system controller 111) drives the imaging optical system 101 to perform focus control. When a shooting instructing unit 111d performs the shooting, the control unit 107 adjusts an exposure of the image pickup unit 100 based on information from the photometry unit 112. In this operation, the image acquired by the image pickup element 103 is input to the image processing unit 105 over a path similar to that described above, subjected to predetermined processing, and then stored in the image recording medium 110 such as a semiconductor memory in a predetermined format. At the same time, the image acquisition condition in the shooting acquired from the state detector 108 is also recorded. The image recorded in the image recording medium 110 may be an image which has been subjected to the reconstruction processing.

In displaying the image stored in the image recording unit 110 on the display unit 106, the image processing unit 105 performs processing based on the image acquisition condition (shooting condition information) used in the shooting. As a result, the image reconstructed with desired settings (a resolution, a viewpoint, a focus position, a depth of field, etc.) is displayed on the display unit 106. A synthesized image resolution specifying unit 111a specifies the resolution of the reconstructed image. Moreover, for higher speed display, the reconstructed image may be displayed on the display unit 106 not via the image recording medium 110, with the desired settings being stored in the storage unit 109 in advance. While there are other elements of the image pickup apparatus 10 than those described above, a description thereof will be omitted since such elements do not serve as main elements in this embodiment. The series of controls described above is performed by the system controller 111.

Next, the configuration of the image pickup unit 100 in this embodiment will be described. The image pickup unit 100 has an arrangement illustrated in FIG. 2. The lens array 102 is arranged at an image-side conjugate plane of the imaging optical system 101 with respect to the object plane 201. In addition, the lens array 102 is configured such that an exit pupil of the imaging optical system 101 and the image pickup element 103 are in an approximate conjugate relationship. The "approximate conjugate relationship" includes not only a strict conjugate relationship, but also a relationship that would be evaluated as a substantial conjugate relationship.

Rays from the object plane 201 are incident on different pixels of the image pickup element 103 via the imaging optical system 101 and the lens array 102 depending on their positions and angles on the object plane 201. This leads to acquisition of parallax image data (light field data). In this process, the lens array 102 (a pupil dividing unit) serves to prevent the rays that have passed through different positions on the object plane 201 from being incident on the same pixel. That is, the lens array 102 causes the rays from the same position on the object plane 201 to be incident on pixels of the image pickup element 103 different from each other depending on pupil regions of the imaging optical system 101 through which the rays pass. As a result, the image pickup element 103 acquires an image in which pixel groups acquired by shooting the same region on the object plane 201 from a plurality of viewpoints are arranged.

Figure 6:
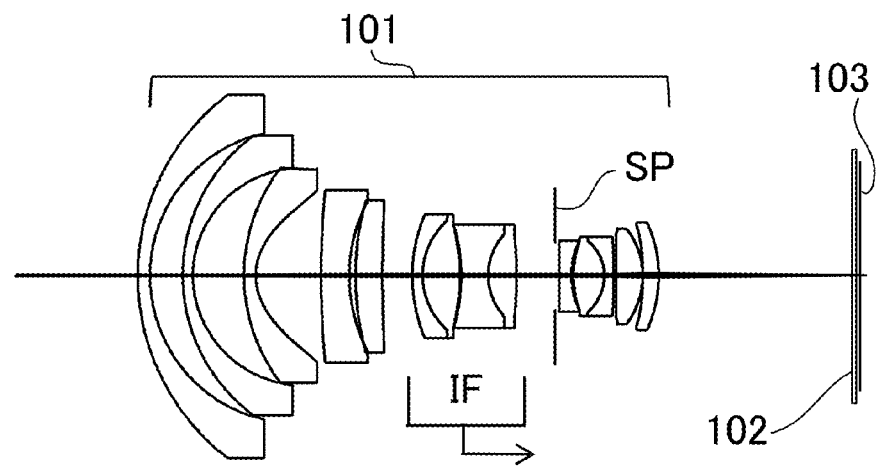
FIG. 6 is a sectional view of the image pickup unit in the first embodiment.

Subsequently, referring to FIG. 6, a section of the image pickup unit 100 will be described. FIG. 6 is a sectional view of the image pickup unit 100 in this embodiment. The imaging optical system 101 of FIG. 6 is a single focus lens. A focus lens unit IF is moved on an optical axis OA to perform focusing. While the lens array 102 is constituted by a solid single lens in this embodiment, applicable lenses are not limited to this and the lens array 102 may include a plurality of lenses. In addition, the lens array 102 may alternatively use a liquid lens, a liquid crystal lens, a diffraction optical element, or the like. Moreover, while, in this embodiment, a small lens constituting the lens array 102 has both faces that are convex shapes, one of the faces may be a flat face or an aspherical face.

Subsequently, the refocus processing will be described. The refocusing is described in detail in Literature "Fourier Slice Photography" (written by Ren Ng, 2005 ACM Trans. Graph. 24, see pages 735-744.). Therefore, it will be described briefly in this embodiment. A basic principle of the refocusing is common among the configurations illustrated in FIGS. 2 to 5. In this embodiment, the configuration illustrated in FIG. 2 will be described as an example.

Since the pupil of the imaging optical system 101 is divided into nine in two dimensions (three in one dimension) in FIG. 2, nine images having different viewpoint are acquired. An image corresponding to a certain divided pupil is hereinafter referred to as a "single viewpoint image". The nine single viewpoint images have a parallax to each other. For this reason, a relative positional relationship among objects on the images varies depending on an object distance. When single viewpoint images are synthesized such that a certain object overlaps, objects located at different object distances are synthesized, being displaced with each other. This displacement makes the objects located at the different object distances blur. The blurring that occurs in this process is determined by a pupil corresponding to the single viewpoint images used for the synthesis, and synthesizing all the nine single viewpoint images enables reproducing the blurring of the image shot using the imaging optical system 101. An object that is to overlap in such single viewpoint image synthesis is chosen arbitrarily. This makes it possible to reproduce the image shot by focusing on an arbitrary object by using the imaging optical system 101. This series of process is a principle of post-shooting focus control, namely, of the refocusing.

Figure 11:
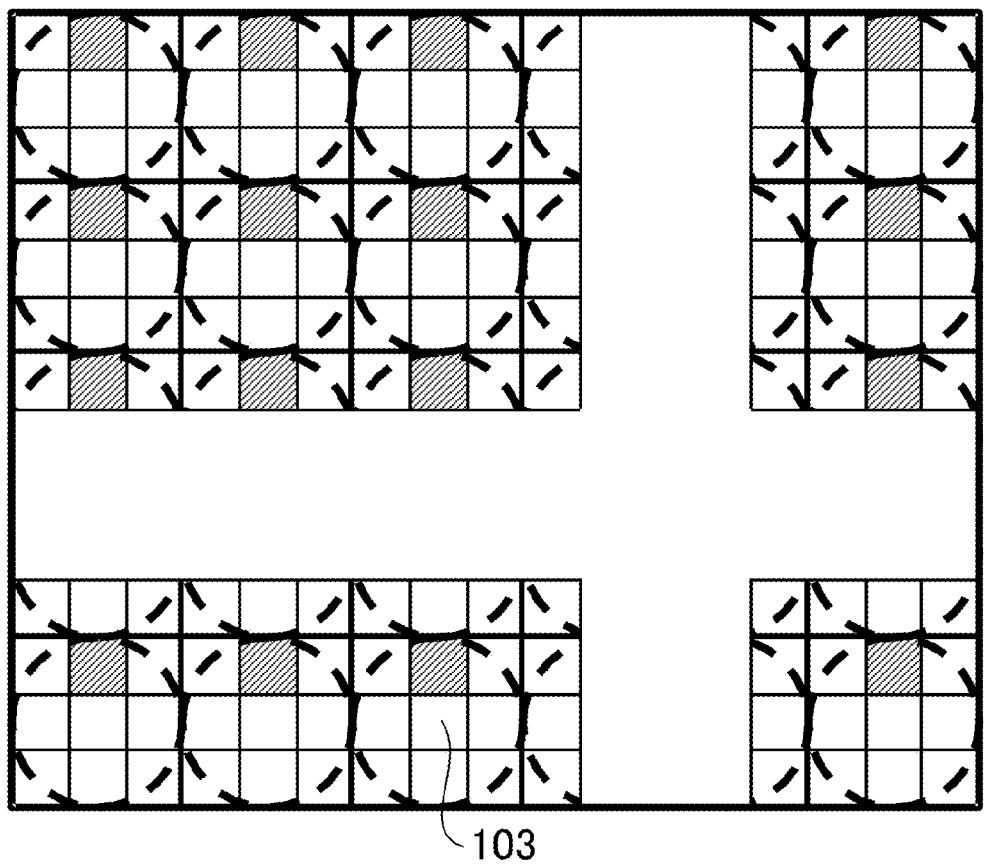
FIG. 11 is an explanatory diagram of generation of a refocus image in the first embodiment.

Subsequently, referring to FIG. 11, a method of generating the single viewpoint image in this embodiment will be described. FIG. 11 is an explanatory diagram of generation of the single viewpoint image in this embodiment and illustrates a relationship between the lens array 102 and the image pickup element 103 of FIG. 2. Each dashed-line circle indicates a region of a pixel on which a ray that has passed through a small lens is incident. While FIG. 11 corresponds to a case where small lenses are arrayed in a grid pattern, applicable arrays of the small lenses are not limited to this. For instance, such an array may alternatively be an array having a six-fold symmetry (a honeycomb structure) or an array in which each small lens is minutely displaced from a regular array. Each oblique-line portion of FIG. 11 indicates a pixel on which rays that have passed through the same pupil region of the imaging optical system 101 are incident. Therefore, extracting such a pixel indicated by its corresponding oblique-line portion enables generating a single viewpoint image observed when an object space is seen from the bottom of the pupil of the imaging optical system 101. Similarly, extracting pixels whose relative positions to respective dashed-line circles are the same enables generating other single viewpoint images as well.

Subsequently, a refocus control range within which a focus position can be changed will be described. Since the refocusing is performed by overlapping the single viewpoint images, it is impossible to refocus a blurred object in each single viewpoint image. The reason for this is that the blurred images remain blurred because a high frequency component cannot be acquired by overlapping them with each other. That is, the refocus control range depends on the divided pupil of the imaging optical system 101. Since a depth of field of each single viewpoint image becomes deeper as the pupil is divided into smaller portions, the refocus control range becomes broader accordingly. However, the depth of field in each single viewpoint image and the refocus control range do not necessarily match. This is because the refocus control range changes depending on a resolution ratio between the single viewpoint image and a reconstructed image acquired by reconstructing the single viewpoint images. For example, when a resolution of the reconstructed image is lower than that of an image at each viewpoint, a sampling pitch of a space component in the reconstructed image is larger than that of each single viewpoint image. Therefore, the reconstructed image has a deeper depth of field than that of each single viewpoint image and the reconstructed image has a broader refocus control range accordingly. Conversely, when the resolution of the reconstructed image is larger than that of each single viewpoint image, the reconstructed image has a refocus control range narrower than the depth of field of each single viewpoint image accordingly. The above description shows that it is necessary to take a reconstruction condition for a single viewpoint image into consideration in order to acquire an accurate refocus control range of the reconstructed image.

Figure 12:
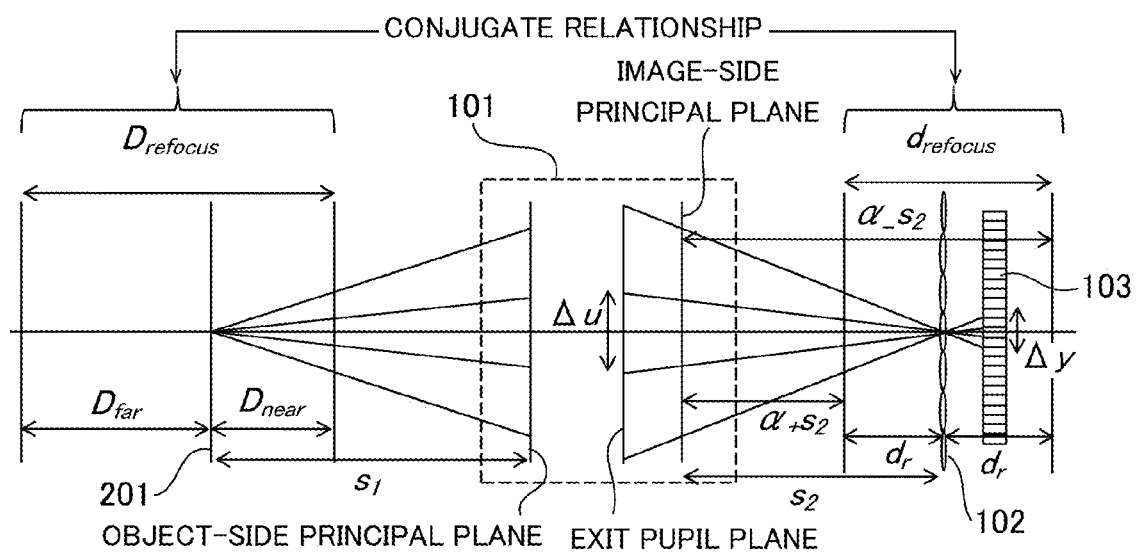
FIG. 12 is an explanatory diagram of a refocus control range in the first embodiment.

Next, a method of calculating the refocus control range of the reconstructed image will be described in detail. First, a depth of focus corresponding to a depth of field of the reconstructed image will be considered. In this embodiment, symbol E denotes a size of a permissible circle of confusion for the depth of focus and symbol Au denotes a sampling pitch of an angle component of a ray. In this case, a refocus coefficient $\alpha_\pm$ is represented by the following Expression (1).

$$\alpha_\pm = \frac{1}{1 \pm \varepsilon/\Delta u} \qquad (1)$$

Where a distance between an image-side principal plane of the imaging optical system 101 and an image-side conjugate plane of the imaging optical system 101 with respect to the object plane 201 is $S_2$, an image-side refocus range represented by Expression (1), which is represented by a product of the refocus coefficient $\alpha_\pm$ and the distance $S_2$, falls within a range between $\alpha_+ s_2$ and $\alpha_- s_2$. Consequently, a range conjugate to the imaging optical system 101 corresponds to a refocus control range that is an object-side refocus range. As illustrated in FIG. 12, a center position of the refocus range is a focus position of the imaging optical system 101. In this case, a position of the lens array 102 is the center position of the refocus range. A relation represented by Expression (1) holds in any of the configurations illustrated in FIGS. 2 to 5.

FIG. 12 is an explanatory diagram of the refocus control range in this embodiment. An "image-side refocus control range $d_{refocus}$" means a range conjugate to the object-side refocus control range via the imaging optical system 101. Symbol Δy denotes a sampling pitch of a two-dimensional intensity distribution of light, which is equal to a pitch $\Delta_{LA}$ of the lens array 102 in the configuration illustrated in FIG. 2. Since a pixel pitch A of the image pickup element 103 is sufficiently small with respect to an exit pupil distance P, Expression (1) can be approximated as represented by the following Expression (2).

$$\alpha_{\pm} s_2 = s_2 \mp NF\Delta y = s_2 \mp NF\Delta_{LA} = s_2 \mp NF\epsilon \quad (2)$$

In Expression (2), the "exit pupil distance P" of the imaging optical system 101 means a distance between an exit pupil plane of the imaging optical system 101 and the image-side conjugate plane of the imaging optical system 101 with respect to the object plane 201. In addition, symbol N denotes a one-dimensional division number of the pupil of the imaging optical system 101 and symbol F denotes an F number of the imaging optical system 101.

The image-side refocus control range $d_{refocus}$ is represented by the following Expression (3) by using Expression (2).

$$d_{refocus} = 2NF\epsilon \quad (3)$$

The image-side refocus control range $d_{refocus}$ can be converted into the object-side refocus control range $D_{refocus}$ by determining the range conjugate with respect to the imaging optical system 101. The conjugate range can be acquired by applying a formula to determine a depth of field.

Of the object-side refocus control range $D_{refocus}$, a range from the object plane 201 toward the image pickup apparatus 10 is defined as $D_{near}$ and a range in a direction away from the object plane 201 is defined as $D_{far}$. In addition, a distance between the object plane 201 and an object-side principal plane of the imaging optical system 101 is defined as $S_1$ and a focal length determined when the imaging optical system 101 forms an image at a position where the object distance is infinity is defined as f. Each of the distance $S_1$ and the focal length f has a positive sign regardless of its direction. In this situation, the following Expression (4) is satisfied.

$$D_{refocus} = D_{far} + D_{near} \quad (4)$$

In Expression (4), the range $D_{far}$ and the range $D_{near}$ are represented by the following Expressions (5) and (6), respectively.

$$D_{far} = \frac{(f - s_1)^2 \times NF\varepsilon}{f^2 + (f - s_1) \times NF\varepsilon} \quad (5)$$

$$D_{near} = \frac{(f - s_1)^2 \times NF\varepsilon}{f^2 - (f - s_1) \times NF\varepsilon} \quad (6)$$

Figure 16:
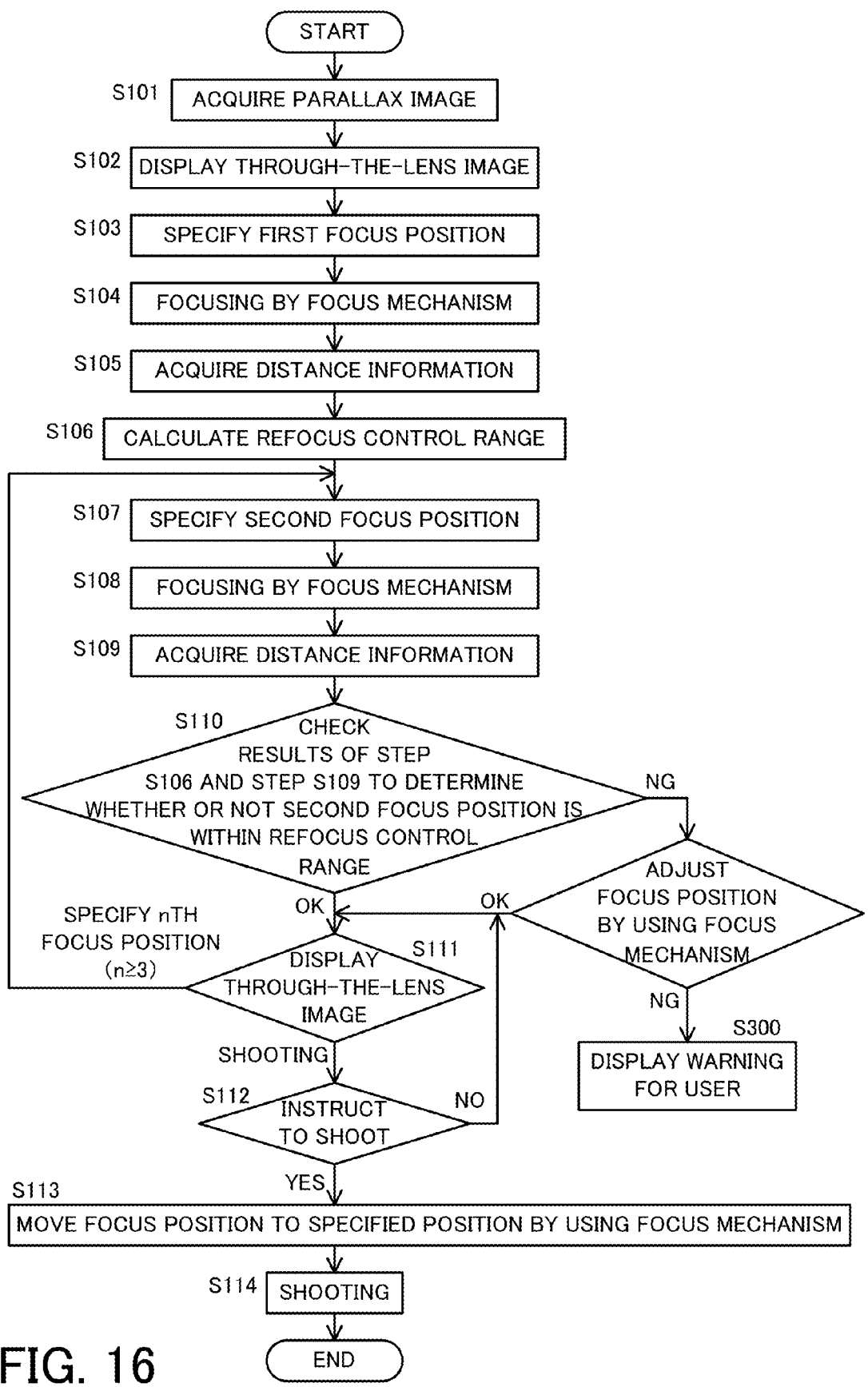
FIG. 16 is a flowchart illustrating shooting processing in the first, second, third, and fourth embodiments.
Figure 17:
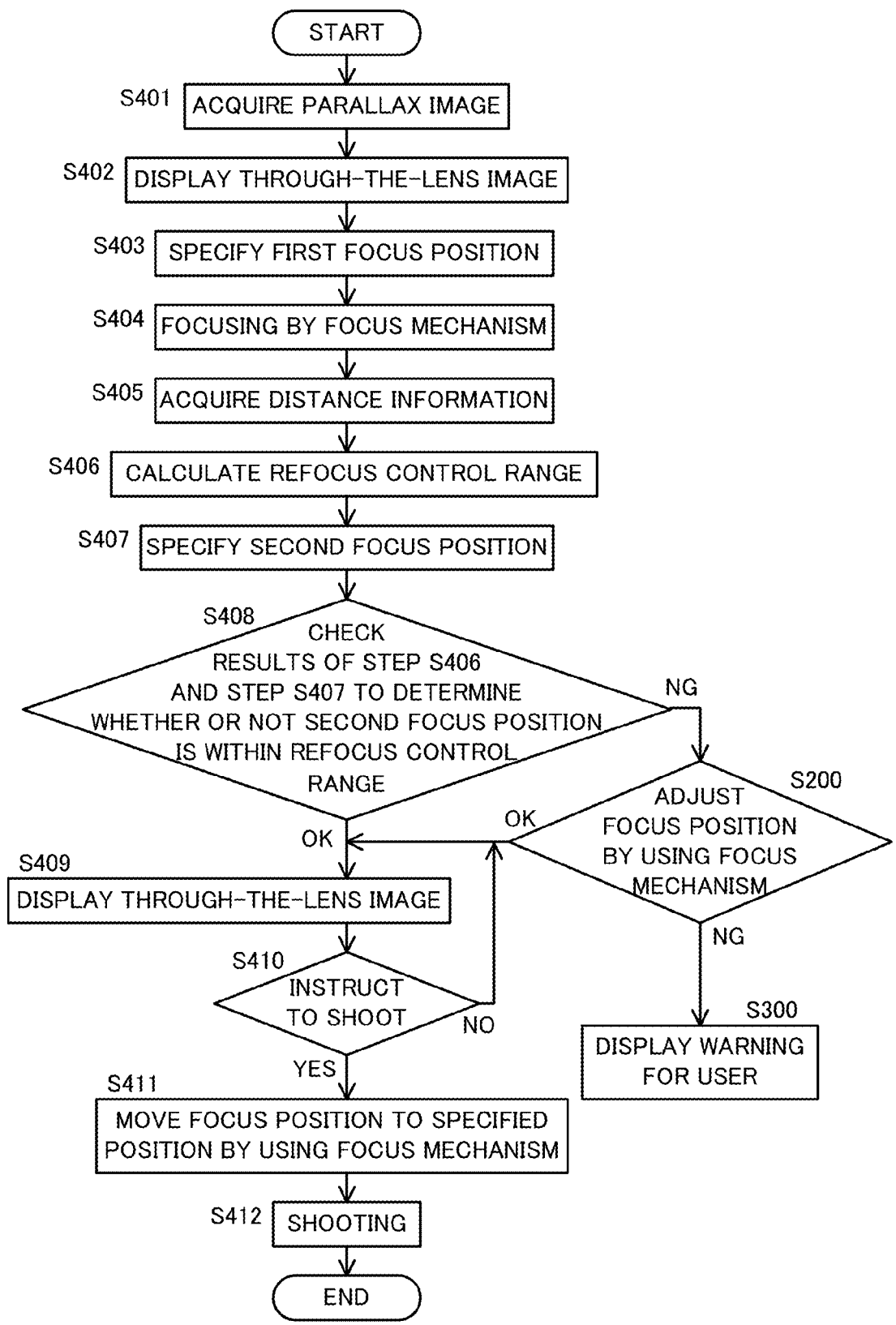
FIG. 17 is a flowchart illustrating shooting processing in the first, second, third, and fourth embodiments.
Figure 18:
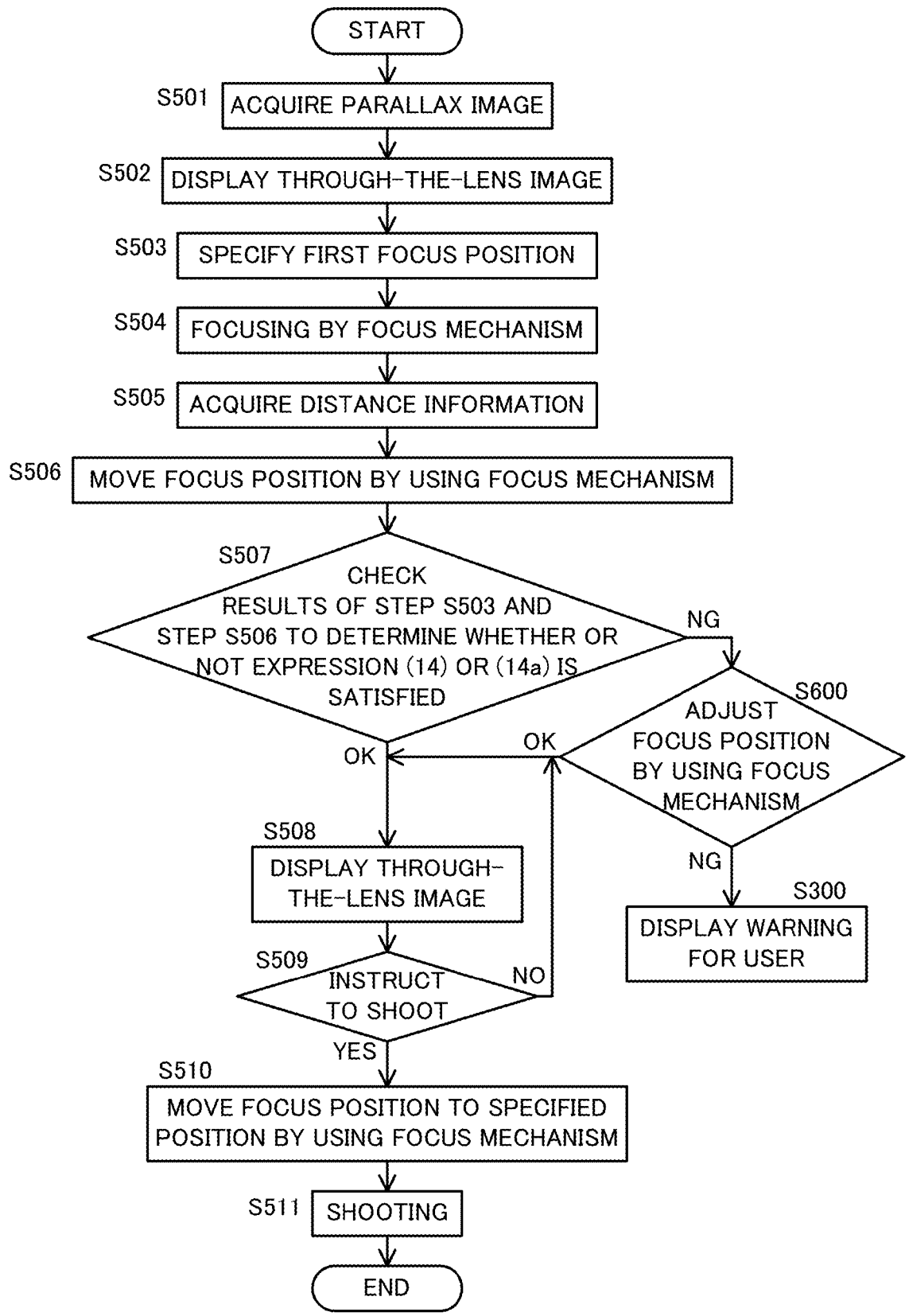
FIG. 18 is a flowchart illustrating shooting processing in the first, second, third, and fourth embodiments.

Next, in this embodiment, a method of placing a plurality of arbitrary points located in an object space within a refocus control range will be described with reference to FIGS. 16 to 18. FIGS. 16 to 18 are flowcharts illustrating shooting processing in this embodiment. The flowcharts of FIGS. 16 to 18 are different in terms of presence or absence of arbitrary objects.

The flowchart of FIG. 16 is a flowchart illustrating an operation in which the arbitrary objects are present. This flowchart is, for example, as illustrated in FIGS. 19A and 19B, a flowchart illustrating an operation in which a user chooses, at the time of shooting, at least one of a plurality of objects, such as persons and objects, actually present in the object space that the user desires to be included in the refocus control range (or that the image pickup apparatus 10 automatically chooses).

On the other hand, the flowcharts of FIGS. 17 and 18 are flowcharts illustrating an operation in which a specific object is absent. For ease of understanding, a description will be given using operation examples. First, an operation, as an example, used in the flowchart of FIG. 17 will be described. As illustrated in FIGS. 20A and 20B, this operation is used when the user desires to set, as the refocus control range, a range from one meter in front of a focus position as a reference set by the focus mechanism of the image pickup apparatus 10 (an actual value of the range is set arbitrarily) up to a position as far as possible. For example, this operation is used for changing a focus position if the user shoots a player, as an object, who is moving at a high speed, such as that observed in a game of sports, with other objects, such as a ball, other players, and the like that are accidentally included in a background of the object to be shot, being unintentionally focused. In this case, an actual object may be absent at a position located one meter in front of the focus position since other objects than the actual object to be shot are not necessarily included in the background thereof. Conversely, a similar flowchart is used also when the user desires to set, as the refocus control range, a range from a position located several-meter far from the focus position (an actual value of the range is set arbitrarily) as a reference up to as near as possible.

Subsequently, the operation example used in the flowchart of FIG. 18 will be described. As illustrated in FIGS. 21A and 21B, this operation is used when the user desires to set, as the refocus control range, a range from the focus position to a position as far as possible without including a range in front of the focus position. One application of this operation is a case where the user shoots a goal scene of a track-and-field race (e.g., a 100-meter race) in front, with the first place runner being focused by the focus mechanism, and changes an original focus position to another focus position to be focused on the second place runner or the third place runner after the shooting. In this case, it is not necessary to make the shot image refocusable because no object is present in front of the focus position originally set (i.e., the first place runner). As described above, this operation can be used when the user desires to effectively control the refocus control range. Each step of the flowcharts of FIGS. 16 to 18 are performed mainly by the image processing unit 105 based on a command (an instruction) of the system controller 111.

First, referring to the flowchart of FIG. 16, a description will be given of a case where the arbitrary objects are present in the shooting. At step S101, the image processing unit 105 acquires parallax images (information on the parallax images) acquired by the image pickup unit 100. Subsequently, at step S102, the image processing unit 105 displays a reconstructed image of the parallax images acquired at step S101 on the display unit 106. This enables the user to check in real time the image (a through-the-lens image) currently acquired by the image pickup element 103. A focus position at this time point is, for example, a focus position focused by the focus mechanism, which is a reconstructed image acquired without performing the refocus processing for the acquired parallax images. The image processing unit 105 may alternatively generate a single viewpoint image whose viewpoint is closest to a center of the pupil of the imaging optical system 101 and display the single viewpoint image on the display unit 106. Simpler processing required for outputting a single viewpoint image than that required for outputting a reconstructed image results in a less time lag, leading to a more speedy display. In addition, when an output is a single viewpoint image, a viewpoint of the single viewpoint image may be an arbitrary position of the pupil of the imaging optical system 101.

Next, at step S103, a first focus position is specified based on the image displayed at step S102. The first focus position may be specified by the user with, for example, a touch panel. Alternatively, the first focus position may be automatically specified utilizing a face recognition technique or the like by the image pickup apparatus 10. Subsequently, at steps S104 and S105, the image processing unit 105 (the distance information acquiring unit 105a) acquires distance information on a distance from the image pickup apparatus 10 to the first focus position. In this process, first, at step S104, the image processing unit 105 prepares for acquiring the distance information at step S105. The "distance information" at step S105 means a distance from the image pickup apparatus 10 to the first focus position.

A method of determining the distance from the image pickup apparatus 10 to the first focus position depends on a method of focusing. As examples, cases of contrast AF and manual focusing (MF) will be described. The contrast AF, which is referred to also as mountain-climbing AF, is a method of automatically driving the focus mechanism based on a contrast of the image acquired by the image pickup apparatus 10 to perform the focusing. On the other hand, the MF is a method in which the user operates the focus mechanism to determine a focus position. In these methods of focusing, a movement distance of the focus mechanism can be utilized for determining the distance from the image pickup apparatus 10 to the first focus position. Depending on specifications of the imaging optical system 101 in the image pickup unit 100, the movement distance of the focus mechanism corresponding to a distance from the image pickup apparatus 10 to an arbitrary focus position is determined. The movement distance can be calculated each time because it is determined by a geometric optical calculation. Alternatively, the movement distance may be determined by previously storing a table of a relation between the movement distance of the focus mechanism and a distance from the image pickup apparatus 10 to the arbitrary focus position and referring to the table. In this case, operating the focus mechanism until it focuses on the first focus position at step S104 enables the image processing unit 105 to acquire the distance information on the distance from the image pickup apparatus 10 to the first focus position at step S105.

When a phase difference AF is used as a method of focusing, step S104 is not necessarily required. The "phase difference AF" means a method of determining a distance by which the focus mechanism is moved by using parallax images and does not need to actually move the focus mechanism in order to determine the distance. As long as the distance by which the focus mechanism is moved is known, the distance from the image pickup apparatus 10 to an arbitrary focus position can be determined as described above. In this case, step S104 may be omitted. As described above, while a process for acquiring the distance information is slightly different depending on the method of focusing, applicable methods of acquiring the distance information are not limited to methods which use the focus mechanism. For instance, the distance information may be acquired by using a method such as DFD (Depth From Defocus), which is a conventional technique or the like, or a ranging unit that utilizes an infrared ray or the like. In a case of any method of focusing is adopted at step S104, the focusing may be performed by using the focus mechanism such that the user can check the object located at the first focus position.

Next, at step S106, the image processing unit 105 calculates a refocus control range for the first focus position based on the distance information acquired at step S105. As described above, the refocus control range varies depending on a resolution ratio between each single viewpoint image and its reconstructed image. For ease of description, a case where the resolution ratio is one will be considered. When the image-side refocus control range falls within the range represented by Expression (2), this means that a refocusable region has been acquired. Therefore, a distance $d_r$ between the image-side conjugate plane of the imaging optical system 101 with respect to the object plane 201 and the image-side refocus control range only has to satisfy the following Expression (7). Symbol $d_r$ denotes a distance whose sign is positive irrespective of a direction.

$$d_r \leq NF\epsilon \quad (7)$$

Figure 27:
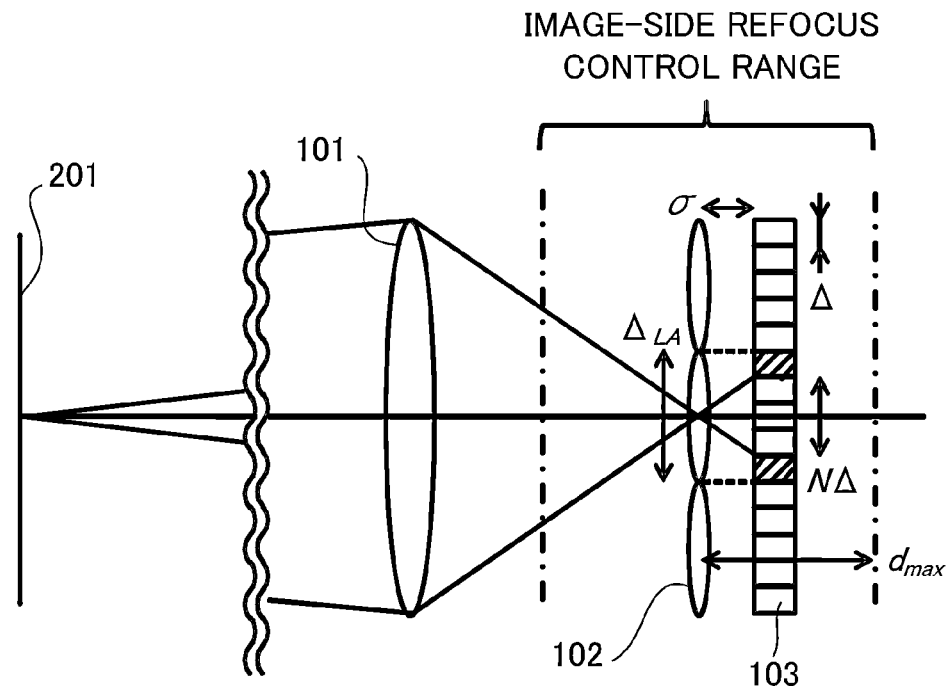
FIG. 27 is an optical arrangement diagram of the image pickup unit in the first embodiment.

It is found with reference to FIG. 27 that Expression (7) geometrically represents $NF=\sigma/\Delta$. FIG. 27 is an optical arrangement diagram of the image pickup unit 100 illustrated in FIG. 2 and illustrates a relationship among parameters. In FIG. 27, symbol $\sigma$ denotes a distance between the image-side principal plane of the lens array 102 and the image pickup element 103. Each dashed line of FIG. 27 indicates a region of the image pickup element 103 corresponding to one of the small lenses and each pixel indicated by an oblique line represents an insensitive zone on which no ray is incident. In this embodiment, since the lens array 102 is configured so as not to have such an insensitive zone, the relation of $\Delta_{LA}=N\Delta$ is satisfied. This embodiment, however, is not limited to this and such an insensitive zone may be present. When the size of the permissible circle of confusion, which defines a focal length, is characterized by the sampling pitch $\Delta y=\Delta_{LA}$ of the space component, Expression (7) is rewritten as the following Expression (8).

$$\frac{d_r}{NF\Delta_{LA}} = \frac{d_r\Delta}{\Delta_{LA}\sigma} \leq \frac{\epsilon}{\Delta_{LA}} \quad (8)$$

Next, a general case where a resolution ratio of the single viewpoint image and that of the reconstructed image is different will be considered. An angle of field of the reconstructed image and that of the single viewpoint image used for the reconstruction are equal to each other. For this reason, when the resolution ratios are different from each other, values of their sampling pitches $\Delta y$ are different from each other. Generally, the smaller the value of sampling pitches $\Delta y$, the larger the permissible circle of confusion is, and vice versa. Therefore, Expression (8) represents a ratio between the values of their sampling pitches $\Delta y$ of the single viewpoint image and the reconstructed image and can be extended as represented by the following Expression (9).

$$\frac{d_r\Delta}{\Delta_{LA}\sigma} \leq \frac{\epsilon}{\Delta_{LA}} \sqrt{\frac{R_{mono}}{R_{synth}}} \quad (9)$$

In Expression (9), symbol $R_{mono}$ denotes a resolution of the single viewpoint image used for the synthesis and symbol $R_{synth}$ denotes that of the reconstructed image. A ratio of the sampling pitches $\Delta y$ can be acquired by determining a square root of a ratio between the resolution $R_{mono}$ and the resolution $R_{synth}$. It is found with reference to FIG. 27 that the resolution $R_{mono}$ of the single viewpoint image is represented by the following Expression (10).

$$R_{mono} = \left(\frac{\Delta}{\Delta_{LA}}\right)^2 R_{total} \qquad (10)$$

In Expression (10), symbol $R_{total}$ denotes the number of effective pixels of the image pickup element 103. Based on results of Expressions (9) and (10), the following Expression (11) that the image-side refocus control range should satisfy is determined.

$$0.0 < \frac{d_r}{\sigma} \sqrt{\frac{R_{synth}}{R_{total}}} \leq 10.0 \qquad (11)$$

Setting the image-side refocus control range as a range of Expression (11) enables acquiring a region refocusable after the shooting. A result of Expression (11) cannot be a negative value in theory. In addition, when the result of Expression (11) is zero, this means that the focus control cannot be performed. Therefore, it is impossible to exceed a lower limit of Expression (11). An upper limit of the result of Expression (11) represents a point spread of the reconstructed image at its focus position. The smaller the point spread, the sharper refocusing can be performed. In a range beyond the upper limit of Expression (11), the point spread is wide making the image blurring even at its focus position. That is, this means that the refocusing has failed.

Desirably, a sharper reconstructed image can be acquired by setting the refocus control range within a range of the following Expression (11a).

$$0.0 < \frac{d_r}{\sigma} \sqrt{\frac{R_{synth}}{R_{total}}} \leq 6.0 \qquad (11a)$$

More desirably, a further sharper in-focus image can be acquired by setting the refocus control range within a range of the following Expression (11b).

$$0.0 < \frac{d_r}{\sigma} \sqrt{\frac{R_{synth}}{R_{total}}} \leq 3.0 \qquad (11b)$$

Values of Expression (11) in this embodiment are as indicated in Table 1. In this embodiment, the number of effective pixels of the image pickup element 103 is $R_{total} = 46.7 \times 10^6$ (pix) and a distance between the image-side principal plane of the lens array 102 and the image pickup element 103 is c=0.0374 (mm). Symbol pix denotes a unit representing the number of pixels. A pixel pitch of the image pickup element 103 is $\Delta$=0.0043 (mm) and that of the lens array 102 is $\Delta_{LA}$=0.0129 (mm). A focal length, an F number, and the number of one-dimensional pupil divisions of the imaging optical system 101 are f=14.0 (mm), F=2.9, and N=3, respectively. The resolution $R_{synth}$ of the reconstructed image may be selected by the synthesized image resolution specifying unit 111a from the following three resolutions: $8.0 \times 10^6$ pix, $5.2 \times 10^6$ pix, and $2.0 \times 10^6$ pix. A value of the distance $d_r$ for each resolution is as indicated in Table 1. Since a resolution for a single viewpoint image is $5.2 \times 10^6$ pix, it is required to increase a resolution by means of, for example, super-resolution from subpixel shift in order to generate a reconstructed image having a resolution of $8.0 \times 10^6$ pix. The resolution $R_{synth}$ of the reconstructed image may be other value than the above values and is not limited to the three variations. However, in such a case, the distance $d_r$ is determined so as to satisfy Expression (7).

The method of calculating a refocus control range described above, however, requires a large amount of processing when calculating the refocus control range on an as needed basis in the shooting. In order to prevent this, the storage unit 109 may be alternatively configured to previously store a table of a refocus control range for each image acquisition condition and to read corresponding data instead of calculating the refocus control range.

As another method of acquiring a refocus control range, a method can be employed which actually generates a refocused reconstructed image and evaluates a contrast and the like of an object present at a focus position. This method, however, requires generating the reconstructed image while changing the focus position and determining, on an as needed basis, whether or not the refocusing can be performed. This makes the entire processing time-consuming. Moreover, when an object is not present at a refocused focus position, an accurate focus control range cannot be acquired because it is impossible to evaluate the contrast or the like of the object. Thus, it is desirable to use the above-mentioned method to acquire the refocus control range.

The description of the flowchart of FIG. 16 will now be continued. At step S107, a second focus position is specified. Similarly to the first focus position, the second focus position can be specified by the user with the touch panel or the like in the shooting. Alternatively, the second focus position may be automatically specified by using the face recognition technology or the like by the image pickup apparatus 10. Since subsequent steps S108 and S109 are similar to steps S104 and 105, respectively, except that the second focus position is applicable, a detailed description thereof will be omitted.

Next, at step S110, the image processing unit 105 determines, by using the following Expression (12), whether or not the second focus position is included in the refocus control range of the first focus position firstly specified.

$$s_{1st\_obj} - D_{1st\_near} \leq D_{2nd\_obj} \leq s_{1st\_obj} + D_{1st\_far} \qquad (12)$$

In Expression (12), symbol $s_{1st\_obj}$ denotes a distance between the first focus position and the object-side principal plane of the imaging optical system 101, and symbols $D_{1st\_near}$ and $D_{1st\_far}$ denote an object-side refocus control range located in front of and behind the first focus position, respectively. When the second focus position is included in the refocus control range of the first focus position at step S110 (if the determination made at step S110 is "OK"), the image processing unit 105 waits until the shooting is performed or specifies a larger number of focus positions. When the image processing unit 105 specifies the larger number of focus positions (n-th focus position), it is enough to return to step S107 to repeat operations of step S107 to S111. In this embodiment, for ease of understanding, a description will be given of a case where two focus positions, which are the first and second focus positions, are specified.

If the determination made at step S110 is "NG", the control unit 107 drives the focus mechanism to adjust the focus position and then changes the refocus control range in step S200. The image processing unit 105 determines a third focus position such that both of the first and second focus positions are included in the refocus control range. A method of determining the third focus position will be described later.

After determining the third focus position, the image processing unit 105 waits for a next instruction at step S111. Upon receipt of a shooting instruction at step S112, the control unit 107 drives the focus mechanism to the third focus position and then changes a current focus position to the third focus position in step S113. At step S114, the system controller 111 performs the shooting. If no determination as "NG" is made at step S110, the first and third focus positions are equal to each other. In this situation, the focus mechanism moves the focus position to the first focus position (keeps the first focus position when the focus mechanism has already moved to the focus position at step S104) and then performs the shooting. The above process is a series of operations in the case where the arbitrary objects are present at the time of the shooting.

Next, a description will be given of a method of determining the third focus position such that both of the first and second focus positions are included in the refocus control range. In this embodiment, three specific methods will be described. A first method is a method which determines an optimum focus position based on a table of relationship between the object distance and the refocus control range. A second method is a method which gradually moves the focus mechanism to search for the optimum focus position. A third method is a method which searches for the optimum focus position based on a contrast of a single viewpoint image. These methods correspond to step S200 of FIG. 16 and are illustrated in flowcharts of FIGS. 23 to 25.

Figure 23:
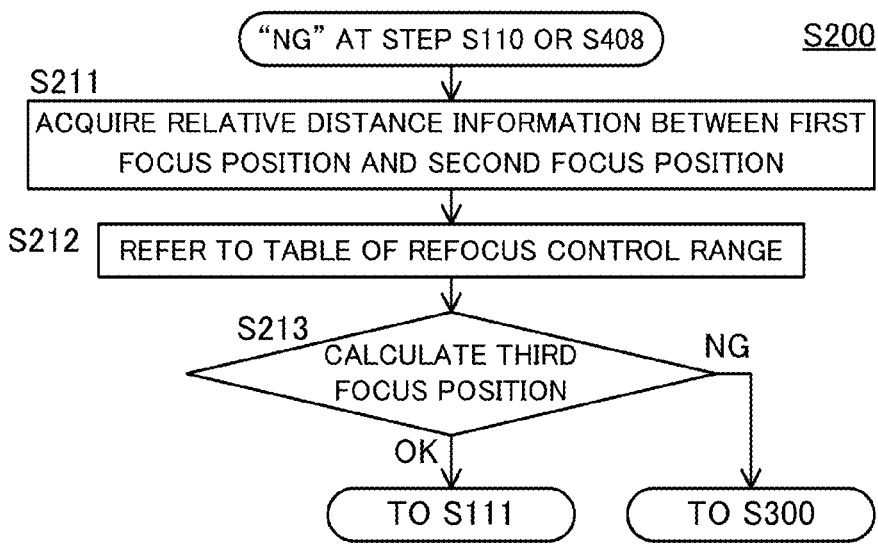
FIG. 23 is a flowchart illustrating the shooting processing in the first, second, third, and fourth embodiments.

The first method is a method which derives the third focus position based on the table of the relationship between the object distance and the refocus control range previously stored. FIG. 22A illustrates an example of the table in this embodiment. FIG. 23 is a flowchart illustrating the first method. At steps S105 and S109, the distances from the image pickup apparatus 10 to the first focus position and the second focus position (distance information) are acquired. Based on the distance information, the image processing unit 105 calculates a relative distance between the first focus position and the second focus position (relative distance information) at step S211. Based on a required refocus control range determined by this calculation, the image processing unit 105 subsequently refers to the table illustrated in FIG. 22A at step S212 and calculates the third focus position at step S213. Since only discrete data can be indicated on the table, interpolation processing may alternatively be performed to calculate a solution when the table does not indicate the solution. When a solution is not present in which both of the first and second focus positions are included in the refocus control range, the flow moves to step S300.

The image processing unit 105 acquires the relative distance information between the first focus position and the second focus position in this manner. Then, the image processing unit 105 calculates the third focus position by using the table which indicates a relationship between the object distance and the refocus control range. It is preferable that the image pickup apparatus 10 further includes a storage unit (e.g., the storage unit 109) storing the table which indicates the relationship between the object distance and the refocus control range.

Figure 24:
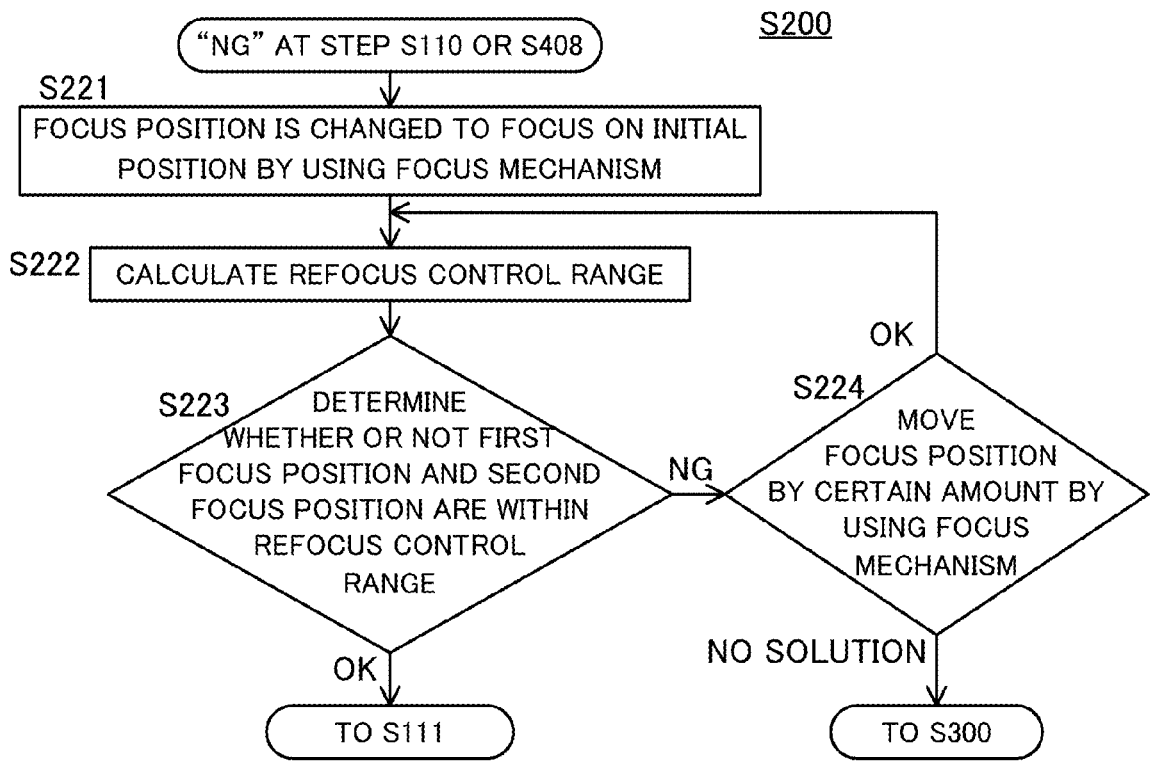
FIG. 24 is a flowchart illustrating the shooting processing in the first, second, third, and fourth embodiments.

The second method is a method which finds out a solution in a search manner by gradually moving the focus mechanism. FIG. 24 is a flowchart illustrating the second method. First, a description will be given assuming that, for ease of understanding, the first focus position is given at step S221 as an initial value of the third focus position to be calculated. This embodiment, however, is not limited to this and another position such as the second focus position may be used as the initial value.

Subsequently, at step S222, the image processing unit 105 calculates a current refocus control range. After that, at step S223, the image processing unit 105 determines whether or not the first and second focus positions are included in the refocus control range by using Expression (12). If the determination is "OK" (the first and second focus positions are included in the refocus control range), the flow returns to step S111 of FIG. 16. On the other hand, if this determination is "NG" (the first and second focus positions are out of the refocus control range), the control unit 107 drives the focus mechanism by a certain amount at step S224. When the initial value is the first focus position, it is enough to drive the focus mechanism in a direction in which an in-focus state is acquired toward the second focus position. When the initial value is neither the first focus position nor the second focus position, it is enough to drive the focus mechanism by a certain amount such that the in-focus state is acquired toward farther one of the first and second focus positions. The control unit 107 may gradually drive the focus mechanism in a certain direction and calculate a refocus control range at every movement. Alternatively, the control unit 107 may roughly drive the focus mechanism at the beginning and then reverse a movement direction of the focus position to change a movement amount of the focus position when the second focus position is included in the refocus control range, but the first focus position is out of the refocus control range. If the image processing unit 105 fails to acquire a solution by moving the focus mechanism by whatever distance, the flow transfers to step S300.

As described above, the image processing unit 105 calculates the refocus control range (for a plurality of focus positions different from each other) while changing a focus position. When the first and second focus positions are included in the refocus control range at a specific focus position, the image processing unit 105 sets the specific focus position as the third focus position. Preferably, the system controller 111 (the control unit 107) determines a movement direction and a movement amount of the focus position based on the refocus control range calculated while changing the focus position.

The third method is a method which makes a determination based on a contrast value of a single viewpoint image. As described above, the refocus control range depends on the depth of field of a single viewpoint image (strictly speaking, however, a resolution ratio between the single viewpoint image and the reconstructed image needs to be considered). For this reason, when comparing the contrasts of the objects at positions corresponding to the first and second focus position in a single viewpoint image and determining that the contrast values are a certain threshold level or higher, the image processing unit 105 determines that the first and second focus positions are included in the refocus control range. This method thus requires as a precondition that there are objects at both of the first and second focus positions. The contrast value can be calculated using the following Expression (13) where, for example, a maximum brightness value in an arbitrary region (e.g., 10×10 pixels) is defined as $L_{max}$ and a minimum brightness value in the arbitrary region is defined as $L_{min}$.

$$m=(L_{max}-L_{min})/(L_{max}+L_{min}) \quad (13)$$

Each of the brightness values $L_{max}$ and $L_{min}$ in Expression (13) may be either single color of R, G or B, or a white brightness value combined by a certain weighing. When a value of m determined by Expression (13) is not smaller than an arbitrary threshold, the image processing unit 105 determines that the objects are included in the refocus control range. The threshold itself is, however, different depending on specifications of the image pickup apparatus 10 and the like (however, since the resolution ratio between the single viewpoint image and the reconstructed image needs to be considered in fact, it is preferable to set the threshold according the resolution ratio).

Figure 25:
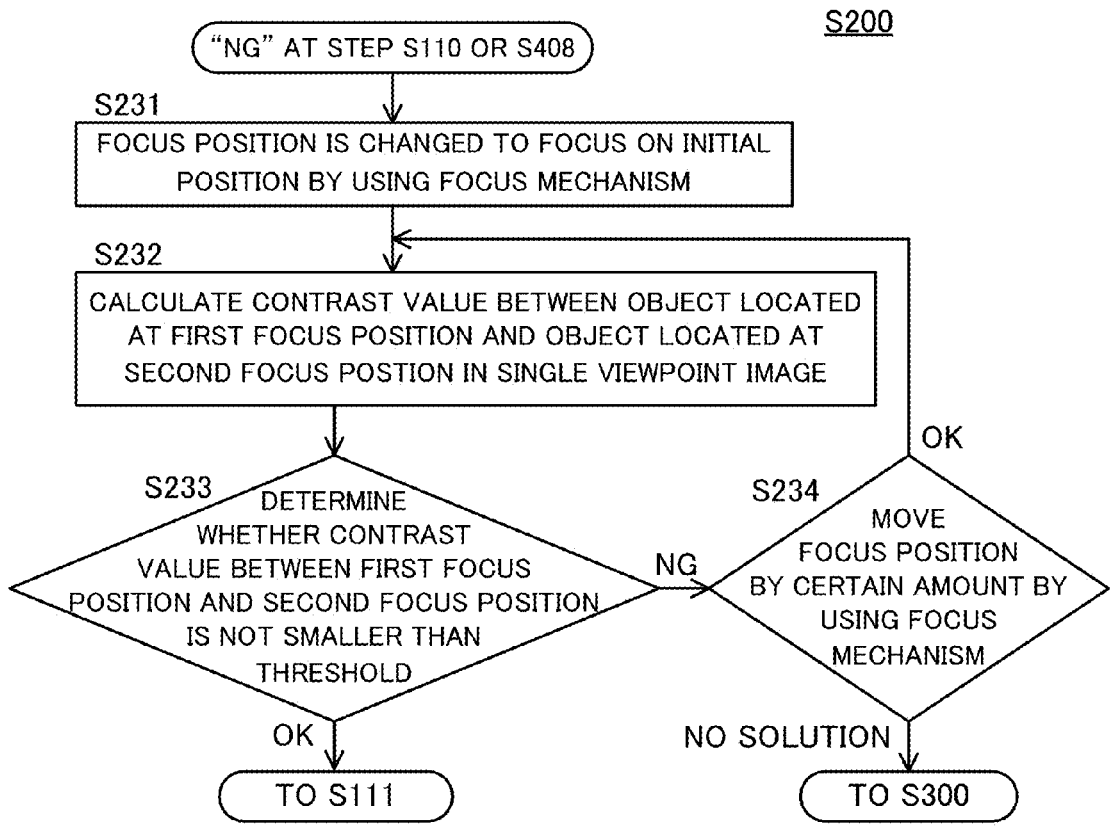
FIG. 25 is a flowchart illustrating the shooting processing in the first, second, third, and fourth embodiments.

FIG. 25 is a flowchart illustrating the third method. Since, in the third method, steps other than those at which a contrast value is calculated and compared (steps S231 and 234) are similar to those of the second method described above, a description thereof will be omitted. At step S232, the image processing unit 105 calculates contrast values of objects located at the first and second focus positions. Then, at step S233, when the contrast values of the first focus position and the second focus position are not larger than the threshold ("NG" at step S233), the control unit 107 drives the focus mechanism by a certain amount at step S234.

As described above, the image processing unit 105 calculates the contrast values at the first focus position and the second focus position with respect to the single viewpoint image. When the contrast values of the first focus position and the second focus position are not smaller than a predetermined threshold, the image processing unit 105 sets a specific focus position as the third focus position.

While the three methods of calculating the third focus position have been described above, other step such as a check step may be provided between each step. Moreover, part or all of the three methods may be combined.

Next, step S300 in a case where a solution for the third focus position is not present will be described. In this case, the display instructing unit 111c gives the display unit 106, such as a finder and a back monitor of the image pickup apparatus 10, a warning to notify the user that a chosen object is out of the refocus control range.

Figures 26A, 26B:
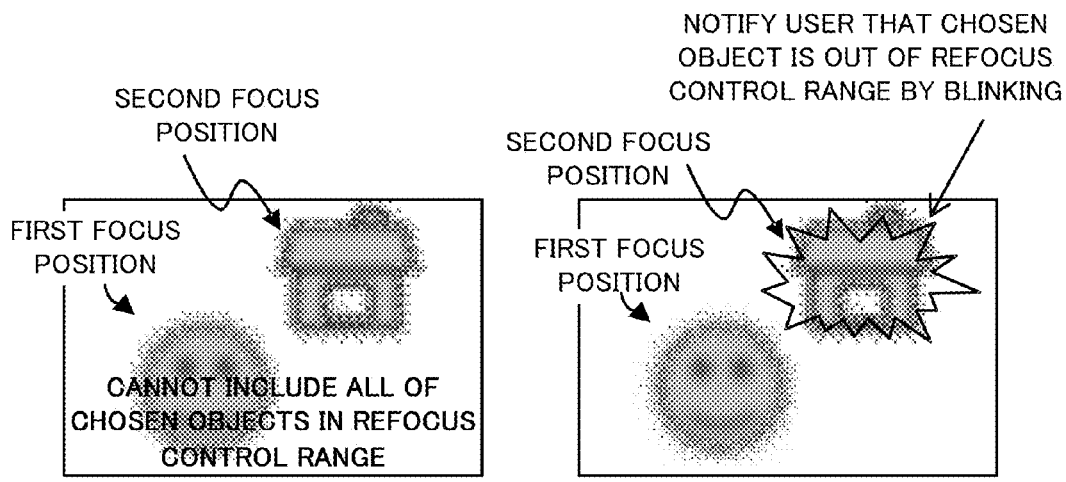
FIGS. 26A and 26B are diagrams illustrating an example of the shooting scene in the first, second, third, and fourth embodiments.

FIGS. 26A and 26B are diagrams illustrating an example of a shooting scene in this embodiment. FIG. 26A illustrates an example of providing a warning on a screen with letters and FIG. 26B illustrates an example of blinking the chosen object to notify the user that the chosen object is out of the refocus control range. It is preferable to provide a step for notifying the user that a solution is not present. Instead of providing such a message on the display image, other notification method such as voice may be used.

Next, the flowchart of FIG. 17 will be described. Since steps S401 to S403 of FIG. 17 are similar to steps S101 to S103 of the flowchart of FIG. 16, respectively, a description thereof will be omitted. At step S404, the control unit 107 drives the focus mechanism to move a current focus position to the focus position specified at step S403. Subsequently, at step S405, the distance information acquiring unit 105a acquires distance information between the image pickup apparatus 10 and the first focus position. Since a method of acquiring the distance information is similar to that at step S105 described above, a description thereof will be omitted. Subsequently, at step S406, the image processing unit 105 acquires a refocus control range at the first focus position. Since a method of acquiring and calculating the refocus control range is similar to that at step S106, a description thereof will be omitted.

Next, at step S407, the image processing unit 105 specifies the second focus position. This example includes the case where one meter before (or far from) the first focus position is set as the second focus position as described in the case of the shooting of the scene of the sport game. The second focus position may be specified at the time of the shooting or may be preset in the storage unit 109 in the image pickup apparatus 10 and read at this step.

Subsequently, at step S408, the image processing unit 105 determines whether or not the second focus position is included in the refocus control range acquired at step S406. A method of determining this is similar to that at step S110. When the second focus position is included in the refocus control range, the image processing unit 105 displays an image currently acquired by the image pickup element 103 (the through-the-lens image) (similar to step S402) and waits for a shooting instruction. Upon receipt of the shooting instruction such as that given by the user by pushing of the release button, the control unit 107 drives the focus mechanism to adjust the focus position at step S411. After that, the system controller 111 performs the shooting at step S412 to finish this flow. Whether to focus either of the first focus position or the second focus position at step S411 depends on the determination made at step S408. When the flow proceeds to step S409 without experiencing any "NG", it is no problem with the first focus position. Therefore, the focus position observed at step S411 is equal to the first focus position. When the flow proceeds to step S200 after the determination made at step S408 is "NG", in step S411, the control unit 107 changes the focus position by the focus mechanism to the third focus position calculated at step S200. Steps S200 and S300 are as described above.

Figure 28:
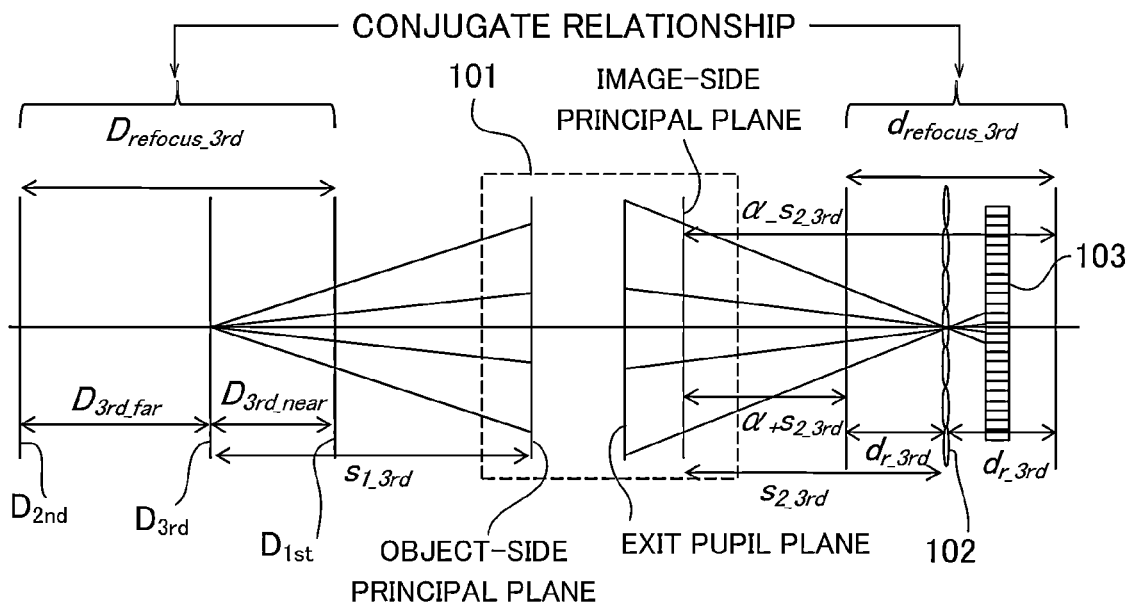
FIG. 28 is an explanatory diagram of the refocus control range in the first embodiment.

Next, the flowchart of FIG. 18 will be described. However, since steps S501 to S505 are similar to steps S401 to S405 of the flowchart of FIG. 17, respectively, a description thereof will be omitted. At step S506, the control unit 107 changes the focus position to the third focus position by driving the focus mechanism so as to move the focus position by a certain amount. This example is a case where, as described with the shooting of the goal scene, the first focus position is located near a boarder of the front-side refocus control range and the refocus control range is set as far from the front-side refocus control range as possible, i.e. is set to the back side (the front side and the back side may be opposite to each other). Therefore, at this step, as illustrated in FIG. 28, a finally determined focus position of the imaging optical system. 101 becomes the third focus position ($D_{3rd}$). FIG. 28 is an explanatory diagram of the refocus control range in this embodiment.

Similarly, a boundary of the front-side refocus control range (the side of the image pickup apparatus 10) with respect to the third focus position is the first focus position $D_{1st}$, and a distance between the third focus position $D_{3rd}$ and the first focus position $D_{1st}$ is denoted as $D_{3rd\_near}$. Conversely, a boundary of the back-side refocus control range (in a direction away from the image pickup apparatus 10) with respect to the third focus position $D_{3rd}$ is the second focus position $D_{2nd}$ and a distance between the third focus position $D_{3rd}$ and the second focus position $D_{2nd}$ is denoted as $D_{3rd\_far}$. The first focus position $D_{1st}$ and the second focus position $D_{2nd}$ are required to satisfy relations represented by the following Expressions (14) and (15) for ensuring this situation where a distance between the third focus position $D_{3rd}$ and the object-side principal plane of the imaging optical system 101 is defined as $s_{1\_3rd}$.

$$D_{1st}=s_{1\_3rd}-D_{3rd\_near} \quad (14)$$

$$D_{2nd}=s_{1\_3rd}+D_{3rd\_far} \quad (15)$$

In Expression (14), however, since the first focus position $D_{1st}$ is located at or near an edge of the refocus control range, it may be out of the refocus control range depending on an accuracy of the focus mechanism. For this reason, it is preferable that Expression (14) has a certain margin α (constant) as in the following Expression (14a).

$$D_{1st}=s_{1\_3rd}-D_{3rd\_near}+\alpha \quad (14a)$$

In Expression (14a), the constant α may be arbitrarily determined by the user so as to suit to a shooting scene or may be written in the storage unit 109 or the like from the beginning. At step S506, the focus position is changed to the third focus position $D_{3rd}$ that satisfies the relations described above. There are several possible methods of changing the focus position. When a method of referring to the table of the relationship between the focus positions and the refocus control ranges, such as the first method, is used, it is enough to determine the third focus position $D_{3rd}$ based on data read from the table or data acquired by performing the interpolation processing for reference data. Even when the table is not available, it is possible to calculate the third focus position $D_{3rd}$ which satisfies Expression (14) or (14a) by calculating the refocus control range based on the above-mentioned parameters. It is preferable to calculate the third focus position $D_{3rd}$ by the above method because the focus position can be changed quickly. In this case, at step S507, the image processing unit 105 determines whether or not the calculated third focus position satisfies Expression (14) or (14a).

When there is no problem at this step, the image processing unit 105 causes the through-the-lens image to be displayed and waits for the shooting instruction at step S508. Upon receipt of the shooting instruction, the control unit 107 proceeds from step S509 to step S510 and changes the focus position to the determined third focus position. The system controller 111 then performs the shooting at step S111. This flow ends upon completion of the shooting. On the other hand, if the determination is "NG" at step S507, an error such as a failure to calculate the third focus position $D_{3rd}$ in the calculation process may have occurred. In this case, it is enough to change the focus position by switching the method to a search approach described later (step S600) or to directly proceed to step S300 and give the user a warning.

Next, a description will be given of a method of determining the third focus position $D_{3rd}$ in a search manner without using the table of the relationship between the focus positions and the refocus control ranges (step S600). This method sets an appropriate initial value as a focus position change amount and then searches for the third focus position $D_{3rd}$ therefrom. While this method resembles the second method and the third method described above, its flowchart is slightly different.

Figure 29:
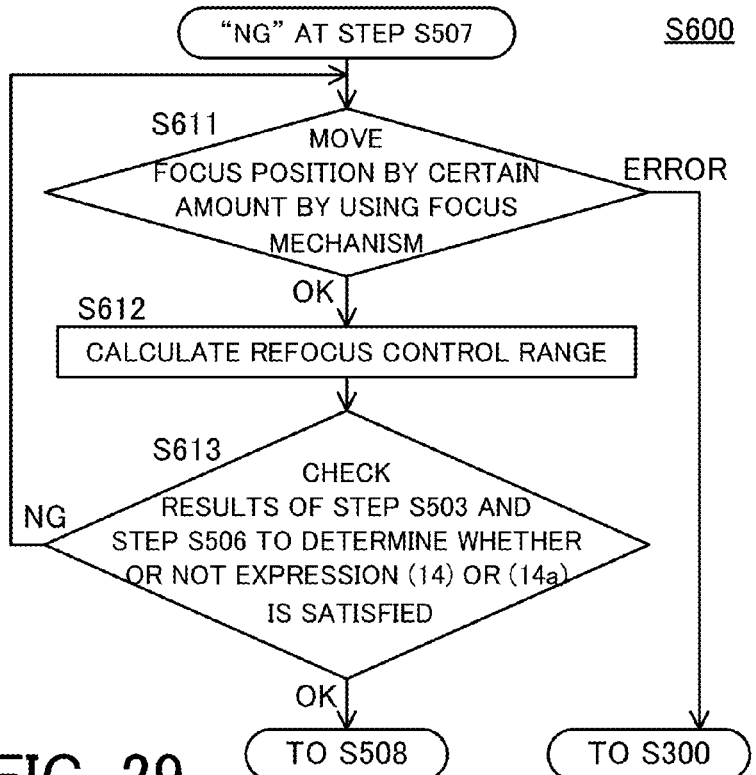
FIG. 29 is a flowchart of the shooting processing in the first, second, third, and fourth embodiments.
Figure 30:
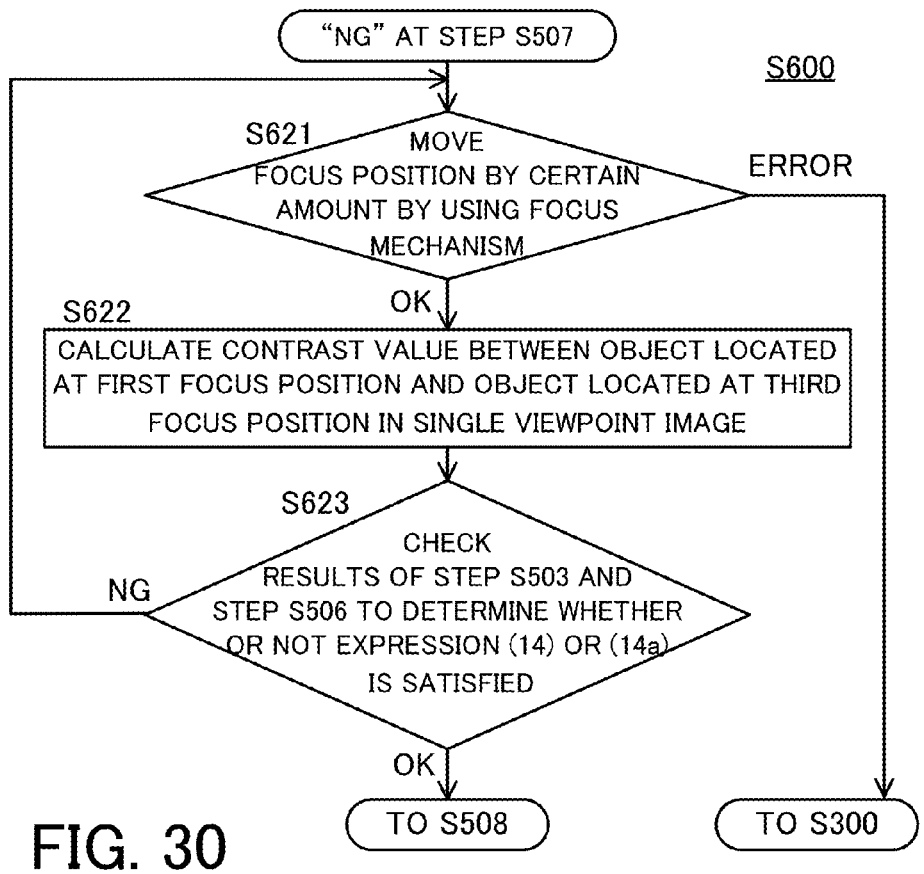
FIG. 30 is a flowchart of the shooting processing in the first, second, third, and fourth embodiments.

FIGS. 29 and 30 are flowcharts of the shooting processing in this embodiment and correspond to step S600 of FIG. 18. FIG. 29 corresponds also to the above-mentioned second method and FIG. 30 illustrates the flowchart corresponding to the third method.

First, at step S506 of FIG. 18, the control unit 107 changes the focus position by using the appropriate initial value. A direction in which the focus position is changed is a direction toward the far side (back side) of the first focus position (a direction away from the image pickup apparatus 10). After that, the image processing unit 105 makes a determination at step S507. If this determination is "OK", the flow proceeds to step S508 as described above and subsequent processing which is the same as that described above follows. On the other hand, if the determination is "NG", the flow proceeds to step S600.

First, referring to FIG. 29, step S600 at which the second method is used will be described in detail. The flow proceeds to step S611 after the determination is "NG" at step S507. The control unit 107 again changes the focus position by a certain amount at this step. The amount of change in the focus position may be the same amount as that described above or may be changed. Subsequently, at step S612, the image processing unit 105 calculates the refocus control range at the changed focus position. A method of calculating the refocus control range is similar to the above-mentioned method. After that, at step S613, the image processing unit 105 makes a determination similar to that at step S507. If the determination is "OK", the flow proceeds to step S508. On the other hand, if the determination is "NG", the flow returns to step S611 and the control unit 107 repeats to change the focus position. A method of moving the focus position at step S611 may gradually move the focus position in a certain direction and calculate the refocus control range in each movement. Alternatively, the method may roughly move the focus position at the beginning and search for the first focus position by reversing a movement direction of the focus position so as to change a movement amount of the first focus position if the first focus position becomes out of the refocus control range. If an error occurs at step S611 such as a deviation from a range (a mechanical range) within which the focus mechanism can move the focus position, the flow proceeds to step S300.

Next, referring to FIG. 30, step S600 using the third method will be described in detail. The flow proceeds to step S621 after the determination is "NG" at step S507. In this step, the control unit 107 again moves the focus position by a certain amount. The amount of change in the focus position may be the same amount as that described above or may be changed. Subsequently, at step S622, the image processing unit 105 calculates a contrast value of each object at the changed focus position. Since a method of calculating the contrast value is similar to the third method, a description thereof will be omitted. After that, at step S623, the image processing unit 105 makes a determination similar to that at step S507. If the determination is "OK", the flow proceeds to step S508. On the other hand, if the determination is "NG", the flow returns to step S621 and the control unit 107 repeats to change the focus position. A method of moving the focus position at step S621 may gradually move the focus position as described in step S611 or may move the focus position in a search manner. If an error occurs at step S621 such as a deviation from a range (a mechanical range) within which the focus mechanism can move the focus position, the flow proceeds to step S300.

In this embodiment, the image processing unit 105 acquires information on the refocus control range. Then, the system controller 111 (the controller 107) performs the focus control based on the information on the refocus control range. Preferably, the image processing unit 105 determines whether or not the second focus position is included in the refocus control range for the first focus position. The system controller 111 (the control unit 107) performs the focus control when the second focus position is not included in the refocus control range. The system controller 111 then changes the first focus position to the third focus position such that both of the first and second focus positions are included in the refocus control range.

Preferably, the image processing unit 105 acquires the third focus position such that the first and second focus positions are included in the refocus control range based on the information on the refocus control range. More preferably, the system controller 111 (the control unit 107) performs the focus control so as to move the focus position to the third focus position. More preferably, the system controller 111 outputs a warning to the user when it determines that the third focus position cannot be set.

More preferably, the image processing unit 105 changes the refocus control range according to at least one of shooting condition information, an angle-of-field region of an input image, and a resolution of a reconstructed output image.

According to this embodiment, it is possible to provide an image pickup apparatus capable of, after a shooting, acquiring a refocus image with a focus position intended by a user.

Second Embodiment

Figure 3:
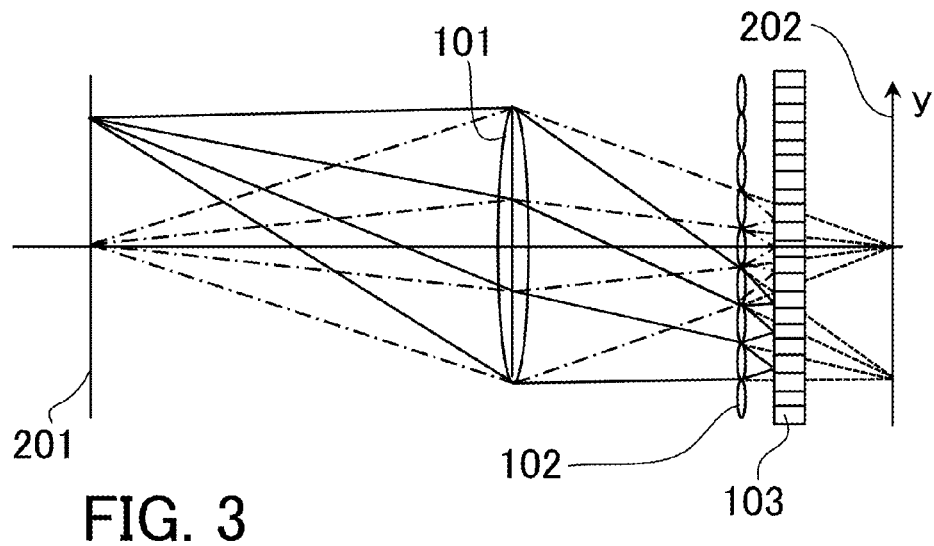
FIG. 3 is a schematic configuration diagram of the image pickup unit in the second embodiment.
Figure 7:
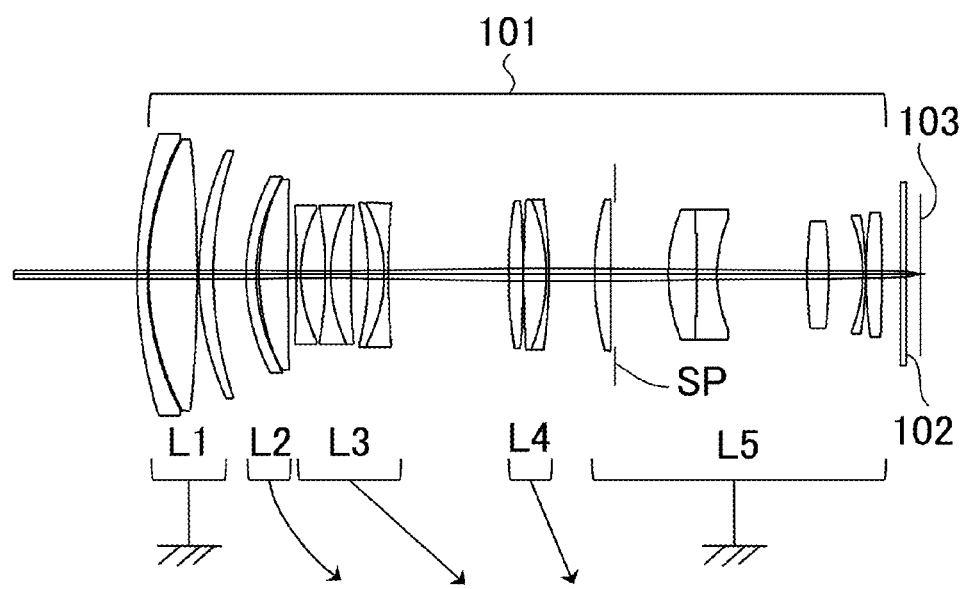
FIG. 7 is a sectional view of the image pickup unit in the second embodiment.

Next, an image pickup apparatus in the second embodiment of the present invention will be described. The image pickup apparatus of this embodiment has a basic configuration illustrated in FIG. 1 similarly to the image pickup apparatus of the first embodiment. In addition, an image pickup unit 100 of this embodiment is arranged as illustrated in FIG. 3. FIG. 7 is a sectional view of the image pickup unit 100 of this embodiment. An imaging optical system 101 is a zoom lens. The imaging optical system 101 is constituted by, in order from an object side, a first lens unit L1 having a positive refractive power, a second lens unit L2 having a positive refractive power, a third lens unit L3 having a negative refractive power, a fourth lens unit L4 having a positive refractive power, and a fifth lens unit L5 having a positive refractive power. In varying the magnification, the first lens unit L1 and the fifth lens unit L5 are fixed, and the second lens unit L2, the third lens unit L3, and the fourth lens unit L4 are moved on an optical axis. In the focusing, the second lens unit L2 is driven.

Figure 4:
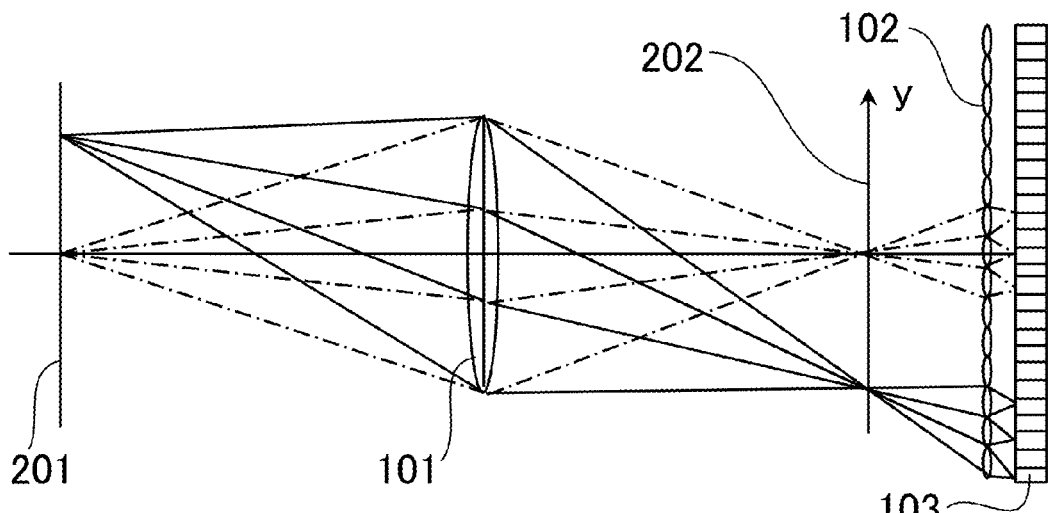
FIG. 4 is a schematic configuration diagram of the image pickup unit in the second embodiment.

As illustrated in FIG. 3, a lens array 102 is arranged closer to the object than to an image-side conjugate plane 202 of the imaging optical system 101 with respect to an object plane 201. The image-side conjugate plane 202 and an image pickup element 103 are arranged to have a conjugate relationship via the lens array 102. Rays from the object plane 201 pass through the imaging optical system 101 and the lens array 102, and then are incident on different pixels of the image pickup element 103 depending on their positions and angles on the object plane 201, which leads to acquisition of a light field. In configurations illustrated in FIGS. 3 and 4, the image pickup element 103 acquires an image in which a plurality of small images with different shooting viewpoints and different shooting ranges from each other are included. The configuration illustrated in FIG. 4 is similar to that illustrated in FIG. 3 except that the lens array 102 is arranged closer to the image side than to the image-side conjugate plane 202. What is different from the configuration illustrated in FIG. 3 is that the lens array 102 views the image formed by the imaging optical system 101 as a real object and causes the image to be re-formed on the image pickup element 103. However, the configurations illustrated in FIGS. 3 and 4 are substantially the same because the lens array 102 views the image formed by the imaging optical system 101 as the real object and causes the image to be formed on the image pickup element 103 in both of the configurations. Therefore, the following description holds also for the configuration illustrated in FIG. 4.

Next, refocus processing in this embodiment will be described. The refocus processing of this embodiment is qualitatively similar to that of the first embodiment, and thus it is enough to overlap images from divided pupils of the imaging optical system 101 with a displacement corresponding to a distance to an object to be focused.

Figure 10A:
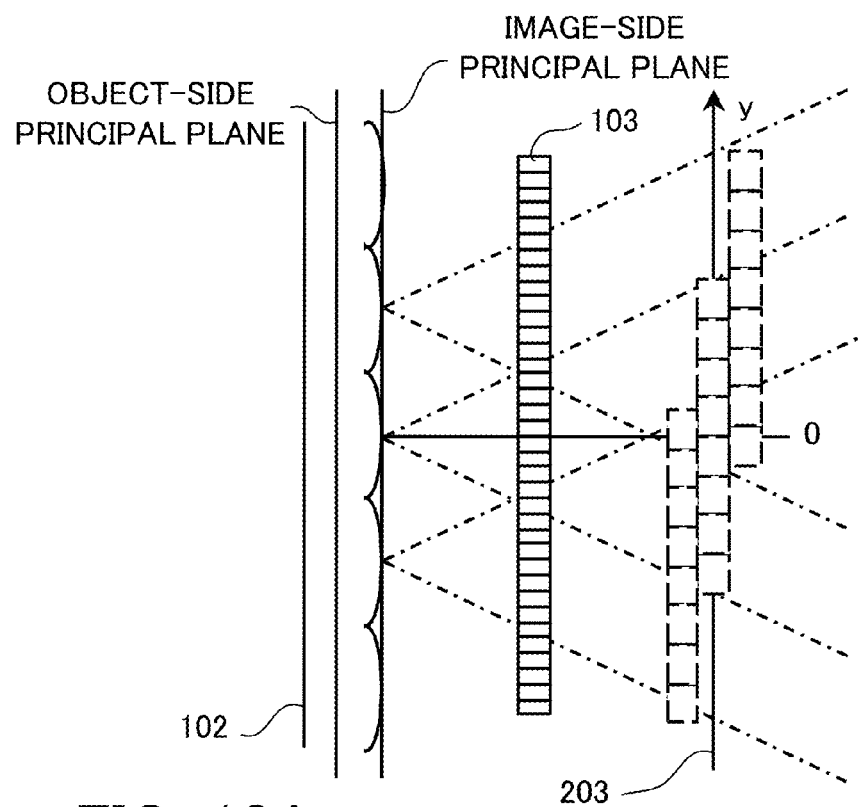
FIGS. 10A and 10B are explanatory diagrams of generation of a refocus image in the second embodiment.
Figure 10B:
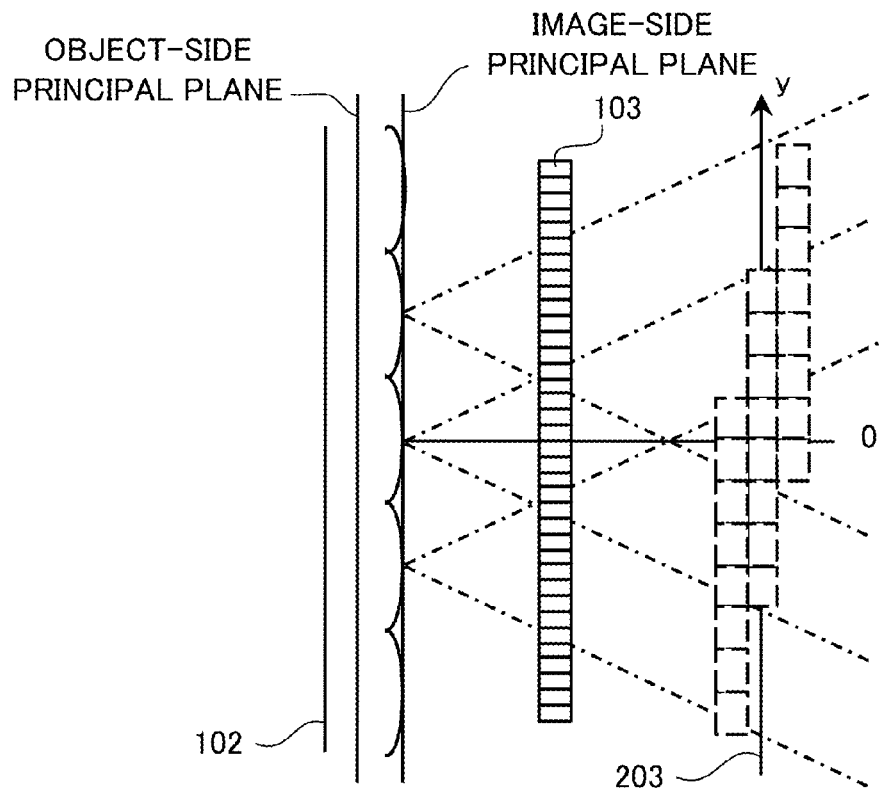

FIGS. 10A and 10B are explanatory diagrams of generation of the refocus image and illustrate detailed partial views of the lens array 102 and the image pickup element 103 in the configuration illustrated in FIG. 3. In this embodiment, the lens array 102 is constituted by small lenses each having a flat object-side face and a convex image-side face. Applicable shapes of the small lenses are, however, not limited to this similarly to the first embodiment. Each dashed-dotted line in FIGS. 10A and 10B indicates an angle of field of each small lens. Projecting and synthesizing each pixel value acquired by the image pickup element 103 on a virtual imaging plane 203 via the small lens corresponding to the pixel enables generating a refocus image focused on the virtual imaging plane 203.

The "virtual imaging plane 203" as used herein means a plane conjugate, via the imaging optical system 101, to a plane at the side of an object to be focused by the refocusing. For instance, in order to generate an image focused on the object plane 201 of FIG. 3, it is enough to set the virtual imaging plane 203 to the image-side conjugate plane 202.

In FIGS. 10A and 10B, the pixels projected in the generation of the refocus image are indicated by a dashed-line and, for ease of understanding, are depicted to be shifted from each other instead of overlapping them. The refocus image may be generated by a method of moving each pixel in parallel to synthesize the pixels when the pixels overlap similarly to the above-mentioned method of projecting each pixel. In this generation, when a region of the lens array 102 through which a light beam incident on pixels has passed is the same, parallel movement amounts of the pixels are the same. That is, an operation of the pixels in the generation of the refocus image in FIGS. 3 and 4 is determined depending on the region of the lens array 102 through which the light beam has passed.

Figure 13:
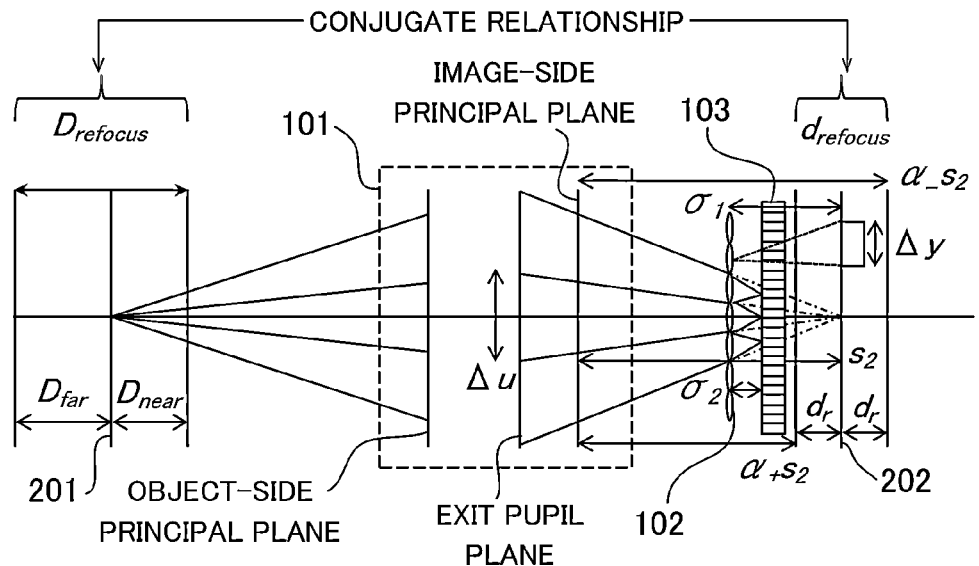
FIG. 13 is an explanatory diagram of a refocus control range in the second embodiment.

Next, the refocus control range will be described. The refocus control range in this embodiment is represented by Expression (1) similarly to the first embodiment. A relationship thereof is as illustrated in FIG. 13. FIG. 13 is an explanatory diagram of the refocus control range in this embodiment. Symbol $\Delta y$ in FIG. 13 denotes a sampling pitch of a two-dimensional intensity distribution of light in FIGS. 3 and 4, and the relation of $\Delta y = \Delta \sigma_1 / \sigma_2$ is satisfied. This is because the lens array 102 causes the image formed by the imaging optical system 101 to be imaged on the image pickup element 103 in a reduced magnification of $\sigma_2/\sigma_1$ by viewing the image as an imaginary object.

In this situation, symbol $\sigma_1$ denotes a distance between the image-side conjugate plane 202 and the object-side principal plane of the lens array 102 and symbol $\sigma_2$ denotes a distance between the image-side principal plane of the lens array 102 and the image pickup element 103. Since the relation of $\Delta \ll P$ is satisfied also in this embodiment, Expression (1) can be approximated to Expression (2). In this embodiment, a process to include a plurality of arbitrary points in an object space in the refocus control range is indicated by the flowcharts of FIGS. 16 to 18. Therefore, a description of parts similar to those of the first embodiment will be omitted.

At steps S106 (FIG. 16) and S406 (FIG. 17) or at step S507 (FIG. 18), the refocus control range of a reconstructed image is calculated and acquired. This calculation method is similar to that of the first embodiment and calculates the image-side refocus control range. FIG. 22B illustrates an example of a table of this embodiment in a case where the table is used by the first method described above. As can be seen from FIG. 13, the geometrical relation of $NF = \sigma_1/\Delta_{LA}$ is satisfied. In addition, since the relation of $\Delta y = \Delta \sigma_1/\sigma_2$ is satisfied as described above, the following Expression (16) is satisfied.

$$R_{mono} = \left(\frac{\sigma_2}{\sigma_1}\right)^2 R_{total} \quad (16)$$

The use of these leads to determination of the following Expression (17) that the distance $d_r$ should satisfy.

$$0.0 < \frac{\Delta_{LA} d_r}{\Delta \sigma_1} \sqrt{\frac{R_{synth}}{R_{total}}} \leq 10.0 \quad (17)$$

Mathematical meanings of upper and lower limits in Expression (17) are similar to those in Expression (11).

Desirably, a sharpness of the reconstructed image increases by including the limits within a range of the following Expression (17a).

$$0.0 < \frac{\Delta_{LA} d_r}{\Delta \sigma_1} \sqrt{\frac{R_{synth}}{R_{total}}} \leq 6.0 \quad (17a)$$

More desirably, a sharper reconstructed image can be acquired by including the limits within a range of the following Expression (17b).

$$0.0 < \frac{\Delta_{LA} d_r}{\Delta \sigma_1} \sqrt{\frac{R_{synth}}{R_{total}}} \leq 3.0 \quad (17b)$$

A value of Expression (17) in this embodiment is as indicated in Table 1. In this embodiment, the number of effective pixels of the image pickup element 103 is $R_{total} = 150.0 \times 10^6$ (pix). In addition, the relations of $\sigma_1 = 0.3712$ (mm) and $\sigma_2 = 0.0740$ (mm) are satisfied. A pixel pitch of the image pickup element 103 is $\Delta = 0.0024$ (mm) and a pitch of the lens array 102 is $\Delta_{LA} = 0.0256$ (mm). A focal length at a wide-angle end of the imaging optical system 101, a focal length at a telephoto end of the imaging optical system 101, an F number from the wide-angle end to the telephoto end, and the number of one-dimensional pupil divisions are $f_W = 72.2$ (mm), $f_T = 194.0$ (mm), F=2.9, and N=5, respectively. The synthesized image resolution specifying unit 111a can choose a resolution $R_{synth}$ of the reconstructed image from three resolutions of $10.0 \times 10^6$ pix, $6.0 \times 10^6$ pix, and $3.0 \times 10^6$ pix. The distance $d_r$ for each resolution is as indicated in Table 1. Since a resolution per single viewpoint image is $6.0 \times 10^6$ pix, a resolution enhancement by a super-resolution from subpixel shift or the like is required in order to generate a reconstructed image having a resolution of $10.0 \times 10^6$ pix.

According to this embodiment, it is possible to provide an image pickup apparatus capable of, after a shooting, acquiring a refocus image with a focus position intended by a user.

Third Embodiment

Figure 5:
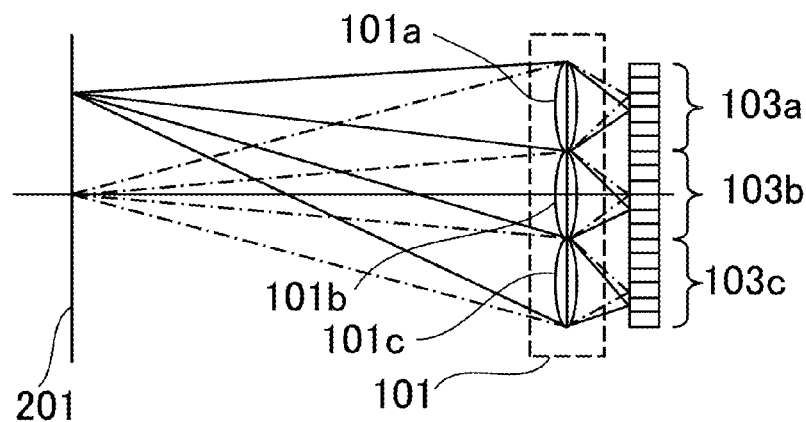
FIG. 5 is a schematic configuration diagram of the image pickup unit in the third embodiment.
Figure 15:
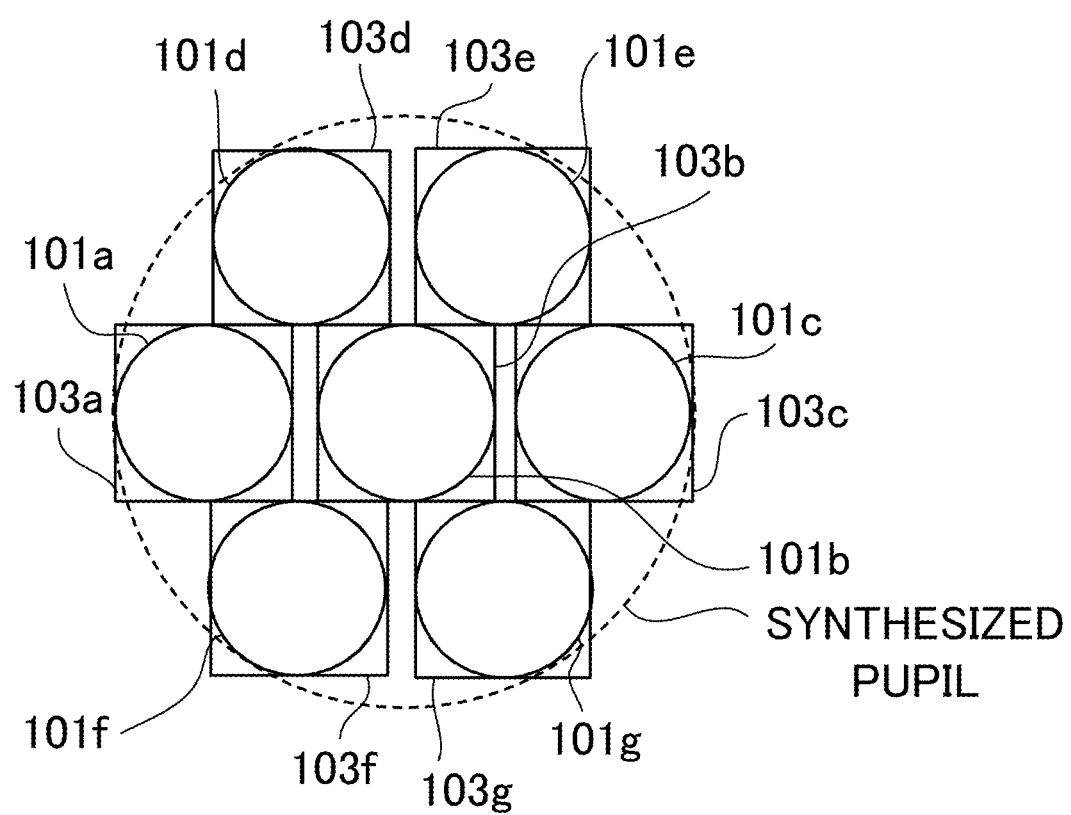
FIG. 15 is a schematic configuration diagram of the image pickup unit in the third embodiment.

Next, an image pickup apparatus in the third embodiment of the present invention will be described. The image pickup apparatus of this embodiment has a basic configuration illustrated in FIG. 1 similarly to the image pickup apparatus of the first embodiment. An image pickup unit 100 of this embodiment is arranged as illustrated in FIG. 5 and is arranged as illustrated in FIG. 15 when seen from an object side. In the third embodiment, the image pickup unit 100 includes a plurality of optical systems 101a to 101g (imaging optical systems) each having a positive refractive power and is configured to have a six-fold symmetry with an optical axis of the optical system 101b being a rotational axis. That is, assuming that a pupil of the imaging optical systems is created by synthesizing (combining) pupils of the plurality of optical systems 101a to 101g (pupil dividing units), the plurality of optical systems 101a to 101g are arranged such that rays from the same position on an object plane are incident on pixels of image pickup elements different from each other, depending on a pupil region of the imaging optical system through which the rays pass.

This embodiment is, however, not limited to this and the number and the array of the imaging optical systems can be changed. At the image side of the plurality of optical systems 101a to 101g, image pickup elements 103a to 103g are arranged. However, the number of the image pickup elements is not required to be plural and may be singular as long as images formed by the optical systems 101a to 101g can be acquired.

The rays refracted by the plurality of optical systems 101a to 101g are received by the corresponding image pickup elements 103a to 103g. Images acquired by the image pickup elements 103a to 103g are parallax images acquired by observing an object space from different viewpoints. Synthesizing the plurality of images enables acquiring a light field of the object space.

Figure 8:
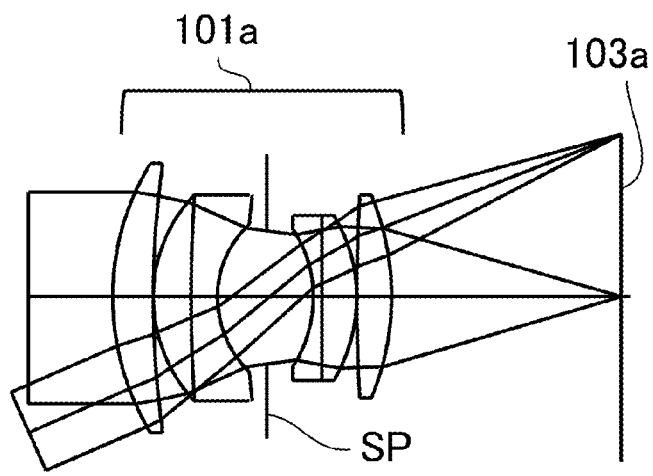
FIG. 8 is a sectional view of an imaging optical system in the third embodiment.

FIG. 8 is a sectional view of the imaging optical system (optical system 101a) and the image pickup element 103a in this embodiment. The other imaging optical systems (optical systems 101b to 101g) and image pickup elements 103b to 103g are similar to this. Configurations of the imaging optical systems 101a to 101g may, however, be different from each other. The imaging optical system (optical system 101a) of FIG. 8 is a single focus lens. Focus control can be performed by changing a distance between the optical system 101a and the image pickup element 103a.

Figure 14:
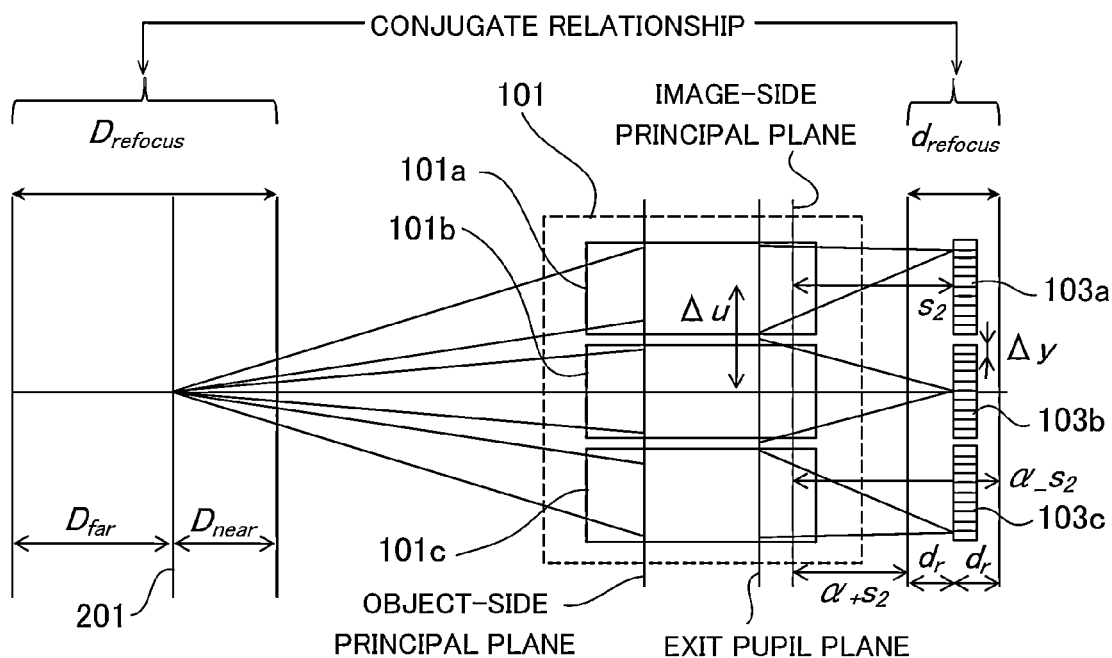
FIG. 14 is an explanatory diagram of a refocus control range in the third embodiment.

Refocus processing in this embodiment can be performed by overlapping images at viewpoints with a displacement corresponding to a distance to an object to be focused, similarly to that in the first embodiment. A focus control range within which the refocusing can be performed is also represented by Expression (1). A relationship thereof is as illustrated in FIG. 14. FIG. 14 is an explanatory diagram of the refocus control range in this embodiment. In this embodiment, the relations of $\Delta y = \Delta$ and $\Delta u = P_{mono}/F_{mono}$ are satisfied. In the latter relation, symbol $F_{mono}$ denotes an F number of one of the imaging optical systems 101a to 101g and symbol $P_{mono}$ denotes an exit pupil distance of one of the imaging optical systems 101a to 101g. Since the relation of $\Delta \ll P_{mono}$ is satisfied, Expression (1) can be approximated to the following Expression (18).

$$\alpha_\pm s_2 = s_2 \mp F_{mono} \Delta_y = s_2 \mp F_{mono} \Delta \quad (18)$$

A process to include a plurality of arbitrary points in the object space within the refocus control range is illustrated by the flowcharts of FIGS. 16 to 18 and a description for parts similar to those of the first embodiment will be omitted. At step S106 (FIG. 16), S406 (FIG. 17), or S507 (FIG. 18), the refocus control range of the reconstructed image is calculated and acquired. An image-side refocus control range is calculated based on a theory similar to that of the first embodiment.

The refocus control range is acquired by substituting the F number of one of the imaging optical systems 101a to 101g acquired by a prediction of an exposure state to the F number $F_{mono}$. Where a resolution of an image formed by any of the imaging optical systems 101a to 101g that has the F number $F_{mono}$ is $R_{mono}$, the following Expression (19) which the distance $d_r$ should satisfy is acquired.

$$0.0 < \frac{d_r}{F_{mono}\Delta}\sqrt{\frac{R_{synth}}{R_{mono}}} \leq 10.0 \quad (19)$$

Mathematical meanings of upper and lower limits in Expression (19) are similar to those in Expression (11).

Desirably, a sharpness of the reconstructed image increases by including the limits within a range of the following Expression (19a).

$$0.0 < \frac{d_r}{F_{mono}\Delta}\sqrt{\frac{R_{synth}}{R_{mono}}} \leq 6.0 \quad (19a)$$

More desirably, a further sharper reconstructed image can be acquired by including the limits within a range of the following Expression (19b).

$$0.0 < \frac{d_r}{F_{mono}\Delta}\sqrt{\frac{R_{synth}}{R_{mono}}} \leq 3.0 \quad (19b)$$

A value of Expression (19) in this embodiment is as indicated in Table 1. In this embodiment, the number of effective pixels and pixel pitch of each of the image pickup elements 103a to 103g are $R_{mono}=19.3\times10^6$ (pix) and $\Delta=0.0012$ (mm), respectively. A focal length and a full open F number of each of the imaging optical systems 101a to 101g are f=50.0 (mm) and F=1.8, respectively. In Table 1, an F number in the shooting is $F_{mono}=1.8$. In the case of a different F number, the distance $d_r$ is determined so as to satisfy Expression (19). In addition, in a high angle-of-field region, the refocus control range is changed depending on a vignetting of the light beam. For instance, when a focal length in an angle-of-field region in an image is as twice as long with respect to a region on an axis, a refocus control range in the angle-of-field region is widen twice as wide as that on the axis. The resolution $R_{synth}$ of the reconstructed image may be selected by the synthesized image resolution specifying unit 111a from the following three resolutions of $19.3\times10^6$ pix, $10.0\times10^6$ pix, and $5.0\times10^6$ pix. A distance $d_r$ for each resolution is as indicated in Table 1.

According to this embodiment, it is possible to provide an image pickup apparatus capable of, after a shooting, acquiring a refocus image with a focus position intended by a user.

Fourth Embodiment

Figure 31:
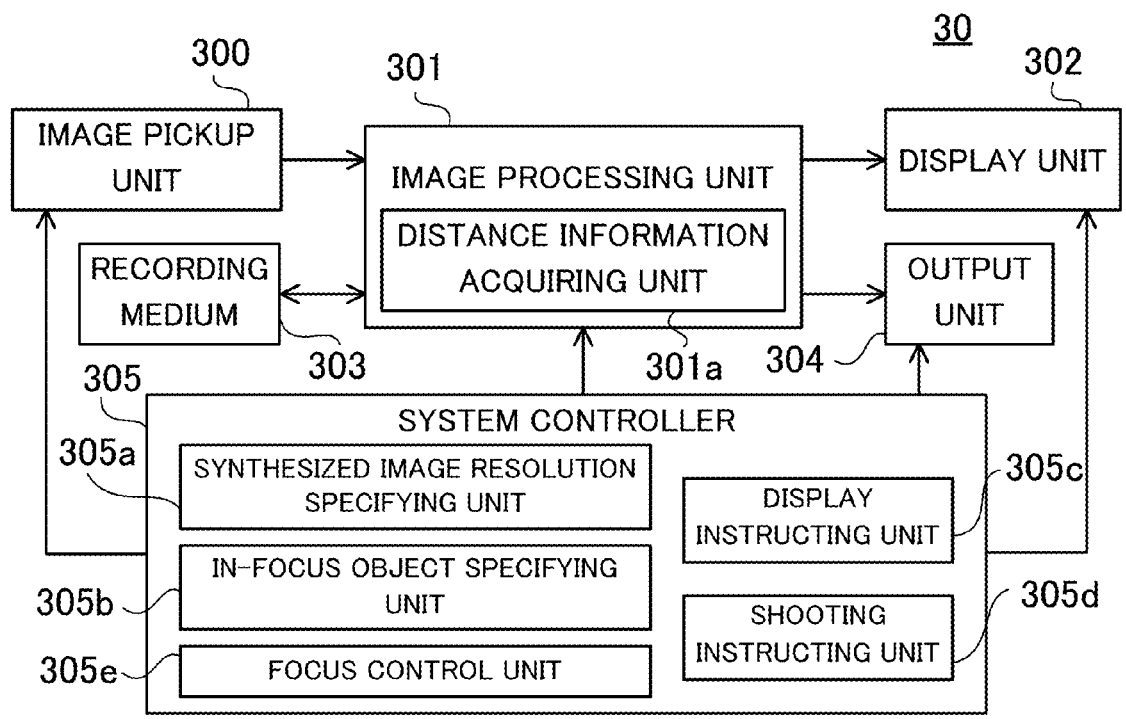
FIG. 31 is a block diagram of an image processing system in the fourth embodiment.
Figure 32:
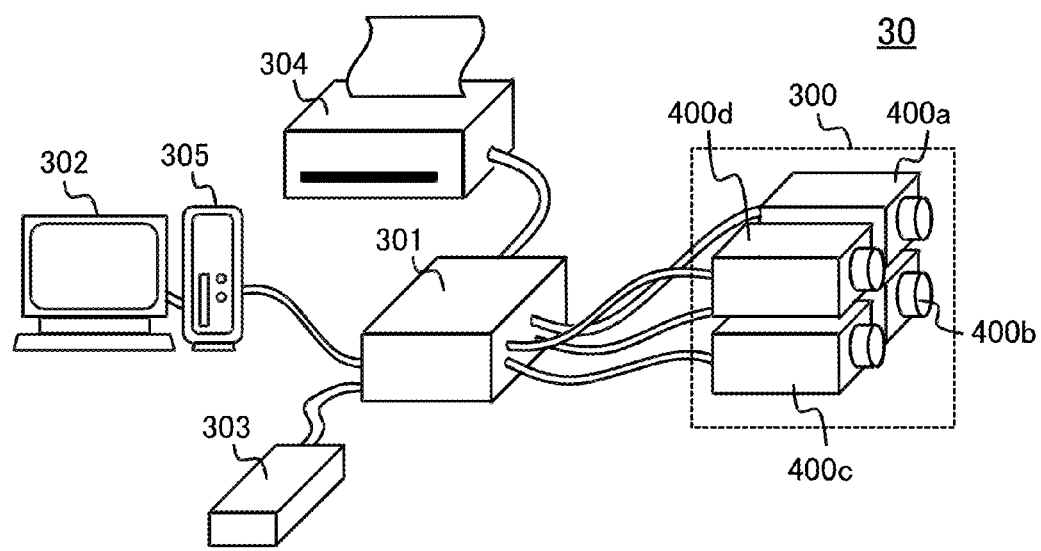
FIG. 32 is a schematic configuration diagram of the image processing system in the fourth embodiment.
Figure 33:
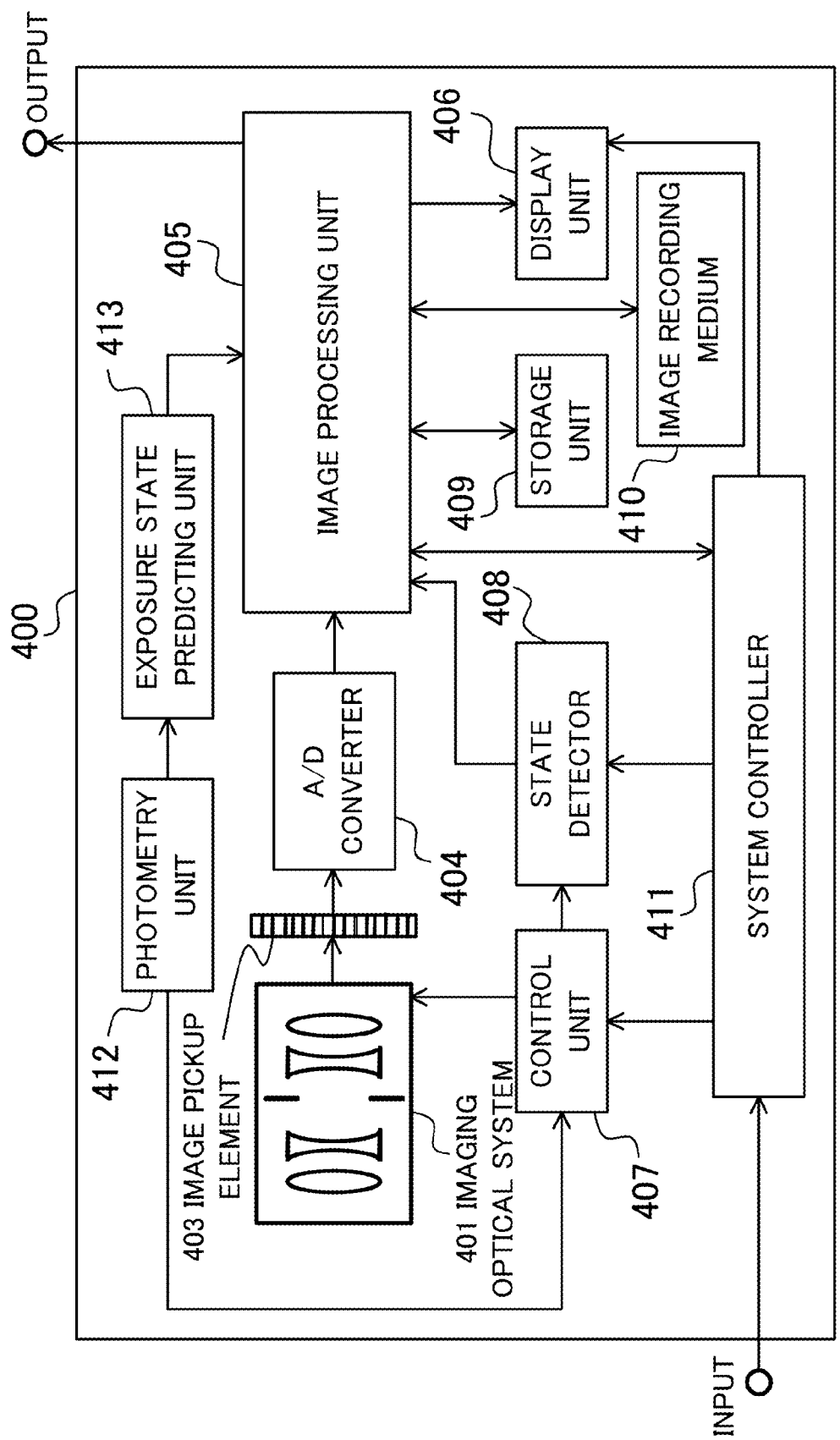
FIG. 33 is a block diagram of a single viewpoint image acquiring unit in the fourth embodiment.

Next, referring to FIGS. 31 to 33, a basic configuration of an image processing system in the fourth embodiment of the present invention will be described. FIG. 31 is a block diagram of an image processing system 30 in this embodiment. FIG. 32 is a schematic configuration diagram of the image processing system 30. FIG. 33 is a block diagram of a single viewpoint image acquiring unit 400 in this embodiment.

As illustrated in FIG. 32, an image pickup unit 300 includes a plurality of single viewpoint image acquiring units 400a to 400d. A single viewpoint image acquiring unit 400 illustrated in FIG. 33 is one of the single viewpoint image acquiring units 400a to 400d. The single viewpoint image acquiring units 400a to 400d each has qualitatively the same configuration as that illustrated in FIG. 5.

An image processing unit 301 illustrated in FIG. 31 is a computer device which performs processing illustrated in FIGS. 16 to 18 and includes a distance information acquiring unit 301a similarly to the first embodiment. An image processed by the image processing unit 301 is output to at least one of a display unit 302, a recording medium 303, and an output unit 304. The display unit 302 is, for example, a liquid crystal display or a projector. The recording medium 303 is, for example, a semiconductor memory, a hard disk, or a server on a network. The output unit 304 is a printer or the like. The user can works while checking the image via the display unit 302 in the shooting or editing. The image processing unit 301 has a function to perform development processing and other image processing as needed in addition to the processing illustrated in FIGS. 16 to 18 and the reconstruction processing. A system controller 305 such as a personal computer (a PC) controls each member. A storage medium such as a CD-ROM storing a program which causes the computer to perform this control may alternatively be used. The system controller 305 includes, similarly to the first embodiment, a synthesized image resolution specifying unit 305a, an in-focus object specifying unit 305b, a display instructing unit 305c, a shooting instructing unit 305d, and a focus control unit 305e.

In FIG. 33, an image formed on an image pickup element 403 via an imaging optical system 401 is converted into an electrical signal (an analog signal). The analog signal is converted by an A/D converter 404 into a digital signal. The digital signal is subjected to predetermined processing by an image processing unit 405 and then output to each member in the single viewpoint image acquiring unit 400 and to the image processing unit 301. Upon receipt of a signal from the system controller 305, a system controller 411 controls each member of the single viewpoint image acquiring unit 400. An exposure state predicting unit 413 is a member which predicts an exposure state in the shooting based on information from a photometry unit 412. A display unit 406 switches "ON" and "OFF" of display and a display image via the image processing unit 405, based on a signal from the system controller 411. When the shooting is performed according to a command (an instruction) from the system controller 411, a control unit 407 adjusts an exposure of the imaging optical system 401 based on the information from the photometry unit 412. At this time, the image acquired by the image pickup element 403 is input via a path similar to that described above to the image processing unit 405, subjected to predetermined processing, and then stored in an image recording medium 410 such as a semiconductor memory in a predetermined format. At the same time, an image acquisition condition in the shooting acquired from a state detector 408 is also recorded. Furthermore, the image recorded in the image recording medium 410 may be an image which has been subjected to the reconstruction processing. Moreover, for higher speed display, the reconstructed image as the image recorded in the image recording medium 410 may be displayed on the display unit 406 not via the image recording medium 410, with desired settings being stored in a storage unit 409 in advance.

Figure 9:
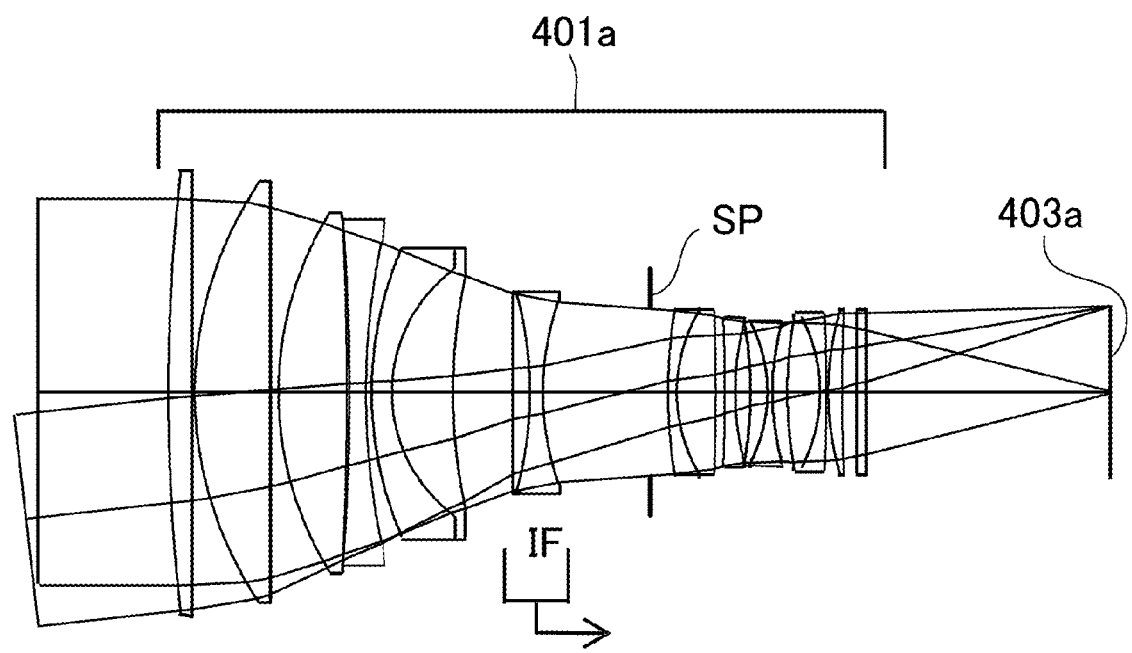
FIG. 9 is a sectional view of an imaging optical system in a fourth embodiment.

FIG. 9 is a sectional view of an imaging optical system 401a and an image pickup element 403a of the single viewpoint image acquiring unit 400a. The imaging optical system 401a illustrated in FIG. 9 is a single focus lens and drives a focus lens unit IF to perform the focusing. The other single viewpoint image acquiring units 400b to 400d are similarly configured. However, the single viewpoint image acquiring units 400a to 400d may have configurations different from each other and the number and array thereof are not limited.

Refocus processing of this embodiment is similar to that of the third embodiment, and generation of a display image in the shooting and editing is also similar to that of the third embodiment. In addition, a value of Expression (19) is as indicated in Table 1. In this embodiment, the number of effective pixels and a pixel pitch of each of the image pickup elements 403a to 403d are $R_{mono}=32.0\times10^6$ (pix) and $\Delta=0.0052$ (mm), respectively. A focal length and a full open F number of each of the imaging optical systems 401a to 401d are f=200.0 (mm) and F=2.0, respectively. The values in Table 1 are values calculated with a predicted F number in the shooting being set to $F_{mono}=2.0$. The resolution $R_{synth}$ of the reconstructed image may be selected by the synthesized image resolution specifying unit 305a from the following three resolutions of $64.0\times10^6$ pix, $32.0\times10^6$ pix, and $8.0\times10^6$ pix. The distance $d_r$ for each resolution is as indicated in FIG. 1. A resolution enhancement by the super-resolution from subpixel shift or the like is required in order to generate a reconstructed image having a resolution of $64.0\times10^6$ pix.

According to this embodiment, it is possible to provide an image processing system capable of, after a shooting, acquiring a refocus image with a focus position intended by a user.

The present invention can be implemented also by performing the following processing. That is, the processing is that software (a program) implementing functions of the embodiments described above is provided via a network or various storage media to a system or an apparatus and a computer (or a CPU or an MPU) thereof reads out and executes the program.

According to the embodiments, it is possible to provide an image pickup apparatus capable of, after a shooting, acquiring a refocus image with a focus position intended by a user, a method of controlling the image pickup apparatus, and a non-transitory computer-readable storage medium.

TABLE 1

| | | | | |
|---|---|---|---|---|
| FIRST EMBODIMENT | $R_{total}$ (pix) 46.7 × 10⁶ | σ (mm) 0.0374 | | |
| | $R_{synth}$ (pix) | $d_r$ (mm) | Expression (11) | |
| | 8.0 × 10⁶ | 0.2260 | 2.5 | |
| | 5.2 × 10⁶ | 0.6166 | 5.5 | |
| | 2.0 × 10⁶ | 1.7174 | 9.5 | |

TABLE 1-continued

| | | | | |
|---|---|---|---|---|
| SECOND EMBODIMENT | $R_{total}$ (pix) 150.0 × 10⁶ | Δ (mm) 0.0024 | $\Delta_{LA}$ (mm) 0.0256 | $\sigma_1$ (mm) 0.3712 |
| | $R_{synth}$ (pix) | $d_r$ (mm) | Expression (17) | |
| | 10.0 × 10⁶ | 1.3208 | 9.8 | |
| | 6.0 × 10⁶ | 0.9918 | 5.7 | |
| | 3.0 × 10⁶ | 0.6398 | 2.6 | |
| THIRD EMBODIMENT | $R_{mono}$ (pix) 19.3 × 10⁶ | Δ (mm) 0.0012 | $F_{mono}$ 1.8 | |
| | $R_{synth}$ (pix) | $d_r$ (mm) | Expression (19) | |
| | 19.3 × 10⁶ | 0.0060 | 2.8 | |
| | 10.0 × 10⁶ | 0.0171 | 5.7 | |
| | 5.0 × 10⁶ | 0.0407 | 9.6 | |
| FOURTH EMBODIMENT | $R_{mono}$ (pix) 32.0 × 10⁶ | Δ (mm) 0.0052 | $F_{mono}$ 2.0 | |
| | $R_{synth}$ (pix) | $d_r$ (mm) | Expression (19) | |
| | 64.0 × 10⁶ | 0.0162 | 2.2 | |
| | 32.0 × 10⁶ | 0.0187 | 1.8 | |
| | 8.0 × 10⁶ | 0.0249 | 1.2 | |

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171816, filed on Aug. 22, 2013, which is hereby incorporated by reference herein in its entirety.

What is claimed is:

1. An image pickup apparatus capable of processing an input image to generate a plurality of output images with focus positions different from each other, the image pickup apparatus comprising:

an imaging optical system;
an image pickup element including a plurality of pixels;
a lens array configured such that rays from the same position on an object plane are incident on pixels of the image pickup element different from each other depending on a pupil region of the imaging optical system through which the ray passes;
a control unit configured to drive the imaging optical system to perform focus control; and an image processing unit configured to acquire a first focus position and a second focus position, determine a third focus position based on the acquired first focus position and the acquired second focus position such that a refocus control range associated with the third focus position includes the first focus position and the second focus position, and perform image processing for the input image acquired by the image pickup element to generate the output image, wherein the image processing unit is configured to determine the third focus position by:

acquiring relative distance information between the first focus position and the second focus position, and determining the third focus position by using a table that indicates a relationship between an object distance and the refocus control range, and wherein the control unit is configured to perform the focus control based on the determined third focus position.

2. The image pickup apparatus according to claim 1, wherein the image processing unit is configured to determine whether the refocus control range with respect to the first focus position includes the second focus position, and wherein, in a case where the second focus position is not included in the refocus control range, the control unit is configured to drive the imaging optical system such that both of the first focus position and the second focus position are included in the refocus control range, to perform the focus control.

3. The image pickup apparatus according to claim 1, wherein the control unit is configured to drive the imaging optical system so as to move the focus position to the third focus position to perform the focus control.

4. The image pickup apparatus according to claim 1, further comprising a storage unit storing the table that indicates the relationship between the object distance and the refocus control range.

5. The image pickup apparatus according to claim 1, wherein the image processing unit is configured to:

calculate the refocus control range while changing the focus position, and set a specific focus position as the third focus position when the first focus position and the second focus position are included in the refocus control range with respect to the specific focus position.

6. The image pickup apparatus according to claim 5, wherein the control unit is configured to determine a movement direction and a movement amount of the focus position based on the refocus control range calculated by the image processing unit while changing the focus position.

7. The image pickup apparatus according to claim 1, wherein the image processing unit is configured to:

calculate contrast values at the first focus position and the second focus position with respect to a single viewpoint image, and set a specific focus position as the third focus position when each of the contrast values at the first focus position and the second focus position is not less than a predetermined threshold.

8. The image pickup apparatus according to claim 1, wherein the image processing unit includes a distance information acquiring unit configured to acquire distance information of an object, and the image processing unit is configured to calculate the refocus control range by using the distance information.

9. The image pickup apparatus according to claim 8, wherein the distance information acquiring unit is configured to acquire the distance information by using parallax information of the input image.

10. The image pickup apparatus according to claim 1, wherein the image processing unit is configured to change the refocus control range according to shooting condition information.

11. The image pickup apparatus according to claim 1, wherein the image processing unit is configured to change the refocus control range depending on an angle-of-field region of the input image.

12. The image pickup apparatus according to claim 1, wherein the image processing unit is configured to change the refocus control range depending on a resolution of the processed output image.

13. An image pickup apparatus capable of processing an input image to generate a plurality of output images with focus positions different from each other, the image pickup apparatus comprising:

an imaging optical system including a plurality of optical systems;

at least one image pickup element including a plurality of pixels;

a control unit configured to drive the imaging optical system to perform focus control; and an image processing unit configured to acquire a first focus position and a second focus position, determine a third focus position based on the acquired first focus position and the acquired second focus position such that a refocus control range associated with the third focus position includes the first focus position and the second focus position, and generate the output image from the input image acquired by the image pickup element, wherein when a pupil of the imaging optical system is a pupil formed by combining pupils of the plurality of optical systems, the plurality of optical systems are arranged such that rays from the same position on an object plane are incident on pixels of the image pickup element different from each other depending on a pupil region of the imaging optical system through which the ray passes, wherein the image processing unit is configured to determine the third focus position by:

acquiring relative distance information between the first focus position and the second focus position, and determining the third focus position by using a table that indicates a relationship between an object distance and the refocus control range, and wherein the control unit is configured to perform the focus control based on the determined third focus position.

14. A method of controlling an image pickup apparatus capable of processing an input image to generate a plurality of output images with focus positions different from each other, the method comprising:

acquiring the input image, the input image including information for a light field, taken by an image pickup apparatus which includes an imaging optical system and an image pickup element including a plurality of pixels;

acquiring a first focus position and a second focus position;

determining a third focus position based on the acquired first focus position and the acquired second focus position such that a refocus control range associated with the third focus position includes the first focus position and the second focus position; and driving the imaging optical system based on the determined third focus position to perform focus control, wherein determining the third focus position includes acquiring relative distance information between the first focus position and the second focus position, and determining the third focus position by using a table that indicates a relationship between an object distance and the refocus control range.

15. A non-transitory computer-readable storage medium storing a program configured to cause a computer to execute a method of controlling an image pickup apparatus capable of processing an input image to generate a plurality of output images with focus positions different from each other, the method comprising:

acquiring the input image, the input image including information for a light field, taken by an image pickup apparatus which includes an imaging optical system and an image pickup element including a plurality of pixels;

acquiring a first focus position and a second focus position;

determining a third focus position based on the acquired first focus position and the acquired second focus position such that a refocus control range associated with the third focus position includes the first focus position and the second focus position; and driving the imaging optical system based on the determined third focus position to perform focus control, wherein determining the third focus position includes acquiring relative distance information between the first focus position and the second focus position, and determining the third focus position by using a table that indicates a relationship between an object distance and the refocus control range.

* * * * *